US012375210B2

(12) United States Patent
Guo et al.

(10) Patent No.: US 12,375,210 B2
(45) Date of Patent: Jul. 29, 2025

(54) METHOD FOR DETERMINING RECEIVING STATUS OF DATA FRAME AND COMMUNICATION APPARATUS

(71) Applicant: Huawei Technologies Co., Ltd., Shenzhen (CN)

(72) Inventors: Yuchen Guo, Shenzhen (CN); Yunbo Li, Shenzhen (CN); Guogang Huang, Shenzhen (CN); Ming Gan, Shenzhen (CN); Mao Yang, Xi'an (CN); Bo Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 573 days.

(21) Appl. No.: 17/860,212

(22) Filed: Jul. 8, 2022

(65) Prior Publication Data

US 2022/0345247 A1  Oct. 27, 2022

Related U.S. Application Data

(63) Continuation of application No. PCT/CN2021/070471, filed on Jan. 6, 2021.

(30) Foreign Application Priority Data

Jan. 11, 2020 (CN) ......................... 202010028842.3

(51) Int. Cl.
*H04L 1/1607* (2023.01)
*H04L 1/08* (2006.01)

(52) U.S. Cl.
CPC .............. *H04L 1/1621* (2013.01); *H04L 1/08* (2013.01); *H04L 1/1614* (2013.01)

(58) Field of Classification Search
None
See application file for complete search history.

(56) References Cited

U.S. PATENT DOCUMENTS 9,991,996 B2   6/2018  Chu et al.
11,108,442 B1*  8/2021  Tian ....................... H04B 17/12
(Continued)

FOREIGN PATENT DOCUMENTS

CN  106487736 A   3/2017
CN  107925520 A   4/2018
(Continued)

OTHER PUBLICATIONS

Taewon Song et al., "Multi-link Acknowledgement," doc.: IEEE 802.11-19/1887r1, Nov. 11, 2019, total 15 pages.
Chitrakar, R. et al., "Multi-link Block Ack Architecture," doc.: IEEE 802.11-20/0055r0, Jan. 10, 2020, 11 pages.
Chu, L. et al., "A-MPDU and BA," Doc.: IEEE 802.11-19/1856r1, XP068165035, Nov. 6, 2019, 11 pages.
(Continued)

*Primary Examiner* — Otis L Thompson, Jr.
(74) *Attorney, Agent, or Firm* — Slater Matsil, LLP

(57) ABSTRACT

A method for determining a receiving status of a data frame and a first multi-link device. The method includes sending data frames to a second multi-link device over multiple links; receiving, over a first link in the multiple links, a block acknowledgment (BA) frame, where a bitmap in the BA frame indicates a receiving status of a data frame transmitted over the first link and indicates a receiving status of a data frame transmitted over a second link in the multiple links, and determining, based on a first time and a second time, a receiving status of a data frame corresponding to a first bit.

20 Claims, 19 Drawing Sheets

(56) References Cited

U.S. PATENT DOCUMENTS

| | | | |
|---|---|---|---|
| 11,424,862 B2 | 8/2022 | Xu et al. | |
| 11,818,799 B1* | 11/2023 | Chu | H04W 80/02 |
| 12,267,194 B2* | 4/2025 | Adachi | H04L 1/1614 |
| 2005/0195858 A1* | 9/2005 | Nishibayashi | H04L 1/1614 |
| | | | 370/474 |
| 2007/0127424 A1 | 6/2007 | Kwon et al. | |
| 2009/0046618 A1* | 2/2009 | Shiba | H04L 12/1886 |
| | | | 370/312 |
| 2012/0057471 A1 | 3/2012 | Amini et al. | |
| 2014/0177614 A1* | 6/2014 | Asterjadhi | H04L 1/1685 |
| | | | 370/338 |
| 2016/0081106 A1* | 3/2016 | Zhou | H04W 24/10 |
| | | | 370/328 |
| 2017/0055255 A1 | 2/2017 | Zhou et al. | |
| 2017/0149547 A1* | 5/2017 | Kim | H04L 1/1685 |
| 2017/0289844 A1* | 10/2017 | Son | H04L 1/1614 |
| 2018/0205502 A1 | 7/2018 | Merlin et al. | |
| 2020/0403757 A1 | 12/2020 | Huang et al. | |
| 2023/0179340 A1* | 6/2023 | Aio | H04L 1/1685 |
| | | | 370/329 |

FOREIGN PATENT DOCUMENTS

| | | |
|---|---|---|
| CN | 110247738 A | 9/2019 |
| CN | 110572244 A | 12/2019 |

OTHER PUBLICATIONS

Hirata, . et al., "Discussion on Multi-link Acknowledgement," IEEE 802.11-19/1532r1, Sep. 16, 2019, 12 pages.

Chitrakar, R. et al., "Multi-link acknowledgment," IEEE 802.11-19/151,216, filed Sep. 10, 2019, 16 pages.

"IEEE P802.11ax/D6.0, , Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11ax/D6.0, Nov. 2019, 780 pages.

IEEE Standard for Information technology—Telecommunications and information exchange between systems Local and metropolitan area networks—Specific requirements, Part 11: Wireless LAN Medium Access Control (MAC) and Physical Layer (PHY) Specifications, IEEE Std 802.Nov. 2016, IEEE Computer Society, Approved Dec. 7, 2016, 3534 pages.

IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, IEEE Std 802.11ac-2013, IEEE Standards Association, Approved Dec. 11, 2013, 425 pages.

Chitrakar, R. et al., "Mulit-Link Acknowledgment," doc: IEEE 802.11-19/1512r0, Sep. 2019, 15 pages.

* cited by examiner

| B0 | B1 | B2  B4 | B5 | B6  B15 |
|---|---|---|---|---|
| Aggregated MAC service data unit (A-MSDU) | BA rule | Service identifier (TID) | Indication information | Buffer size |

METHOD FOR DETERMINING RECEIVING STATUS OF DATA FRAME AND COMMUNICATION APPARATUS

CROSS-REFERENCE TO RELATED APPLICATIONS

This application is a continuation of International Application No. PCT/CN2021/070471, filed on Jan. 6, 2021, which claims priority to Chinese Patent Application No. 202010028842.3, filed on Jan. 11, 2020. The disclosures of the aforementioned applications are hereby incorporated by reference in their entireties.

TECHNICAL FIELD

The present invention relates to the communication field, and in particular, to a method for determining a receiving status of a data frame and a communication apparatus.

BACKGROUND

With development of wireless technologies, a growing quantity of wireless devices support multi-band communication. For example, communication is performed on 2.4 GHz, 5 GHz, and 60 GHz frequency bands at the same time, or communication is performed on different channels of a same frequency band (or different frequency bands) at the same time, to increase a communication rate between devices. Such devices are usually referred to as multi-band devices, or multi-link devices, and sometimes are alternatively referred to as multi-link entities or multi-band entities. The following uses the multi-link device as an example for description.

The multi-link device usually includes multiple stations (stations, STAs), and each station works on a specific frequency band or channel. The multi-link device may be an access point device, or a station device. If the multi-link device is an access point device, the multi-link device includes one or more access points (access points, APs). If the multi-link device is a station device, the multi-link device includes one or more non-access point stations (non-access point stations, non-AP STAs). For example, as shown in FIG. 1, a multi-link access point device includes an AP 1 to an AP n, and a multi-link station device include a STA 1 to a STA n. The AP 1 and the STA 1 are corresponding to a link 1, the AP 1 and the STA 1 are corresponding to a link 2, and the AP n and the STA 1 are corresponding to a link n. The multi-link access point device may send data frames to the multi-link station device over the link 1 to the link n. After receiving the data frames, the multi-link station device may send, over one link to the multi-link access point device, a block acknowledgment (block ACK, BA) frame that includes a receiving status of a data frame on another link. However, after receiving the BA frame, the multi-link access point device can determine, based on the BA frame, only a receiving status of a data frame transmitted over the link, and may not accurately determine the receiving status of the data frame transmitted over the another link.

SUMMARY

Embodiments of the present invention provide a method for determining a receiving status of a data frame and a communication apparatus, to help improve accuracy of determining a receiving status of a data frame.

According to a first aspect, this application provides a method for determining a receiving status of a data frame. The method includes: A first multi-link device sends data frames to a second multi-link device over multiple links. The first multi-link device receives, over a first link in the multiple links, a block acknowledgment BA frame sent by the second multi-link device, where the BA frame carries a bitmap, and the bitmap indicates a receiving status of a data frame transmitted over the first link and indicates a receiving status of a data frame transmitted over a second link in the multiple links. The first multi-link device determines, based on a first time and a second time, a receiving status of a data frame corresponding to a first bit, where the first time is a transmission time of the data frame corresponding to the first bit, and the second time is a receiving time of the BA frame. The first bit is a bit that is in the bitmap and that is corresponding to the data frame transmitted over the second link, and a value of the first bit is a first value. Optionally, the first value may be 0. Based on the method described in the first aspect, accuracy of determining a receiving status of a data frame is improved. This avoids that the first multi-link device determines a receiving status of a data frame that has been successfully received by the second multi-link device as receiving failure, and unnecessarily retransmits the data frame.

In a possible implementation, a specific implementation in which the first multi-link device determines, based on the first time and the second time, the receiving status of the data frame corresponding to the first bit is: If a delay between the second time and the first time is greater than or equal to a first threshold, the first multi-link device determines that the receiving status of the data frame corresponding to the first bit is receiving failure. If the delay between the second time and the first time is greater than or equal to the first threshold, it indicates that before the second multi-link device generates the BA frame, a station on the second link in the second multi-link device has sufficient time to transfer the receiving status of the data frame corresponding to the first bit to a station on the first link in the second multi-link device. Therefore, if the delay between the second time and the first time is greater than or equal to the first threshold, the receiving status of the data frame corresponding to the first bit is the receiving failure. It can be learned that, based on this possible implementation, the receiving failure status of the data frame corresponding to the first bit can be accurately determined.

In a possible implementation, if the delay between the second time and the first time is less than a second threshold, the first multi-link device determines that the station corresponding to the first link in the second multi-link device does not obtain the receiving status of the data frame corresponding to the first bit, where the second threshold is less than the first threshold. If the delay between the second time and the first time is less than the second threshold, it indicates that before the second multi-link device generates the BA frame, the station on the second link in the second multi-link device does not have sufficient time to transfer the receiving status of the data frame corresponding to the first bit to the station on the first link in the second multi-link device. Therefore, if the delay between the second time and the first time is less than the second threshold, the receiving status of the data frame corresponding to the first bit is that the station corresponding to the first link in the second multi-link device does not obtain the receiving status of the data frame corresponding to the first bit. It can be learned that, based on this possible implementation, it can be accurately determined that the station corresponding to the first link in the second multi-link device does not obtain the receiving status of the data frame corresponding to the first bit.

In a possible implementation, T=t2−t1, or T=f(t2−t1). T is the delay between the second time and the first time, t2 is the second time, and t1 is the first time. f( ) indicates that T is a function of (t2−t1). To be specific, when T=t2−t1, the delay between the second time and the first time is duration between the transmission time of the data frame corresponding to the first bit and the receiving time of the BA frame. (t2−t1) or f(t2−t1) is used as the delay between the second time and the first time, to help improve accuracy of determining a receiving status of a data frame.

In a possible implementation, T=t2−t1−t3, or T=f(t2−t1−t3). T is the delay between the second time and the first time, t2 is the second time, and t1 is the first time. f( ) indicates that T is a function of (t2−t1−t3). To be specific, when T=t2−t1−t3, the delay between the second time and the first time is duration between the transmission time of the data frame corresponding to the first bit and a transmission time of the BA frame, or duration between a receiving time of the data frame corresponding to the first bit and the receiving time of the BA frame. (t2−t1−t3) or f(t2−t1−t3) is used as the delay between the second time and the first time, to help improve accuracy of determining a receiving status of a data frame.

In a possible implementation, T=t2−t1−2*t3, or T=f(t2−t1−2*t3). f( ) indicates that T is a function of (t2−t1−2*t3). T is the delay between the second time and the first time, t2 is the second time, t1 is the first time, and t3 is a propagation delay between the first multi-link device and the second multi-link device. To be specific, when T=t2−t1−2*t3, the delay between the second time and the first time is duration between a receiving time of the data frame corresponding to the first bit and a transmission time of the BA frame. (t2−t1−2*t3) or f(t2−t1−2*t3) is used as the delay between the second time and the first time, to help improve accuracy of determining a receiving status of a data frame.

In a possible implementation, before the first multi-link device sends the data frames to the second multi-link device over the multiple links, the first multi-link device may further receive first information sent by the second multi-link device, where the first information carries the first threshold. Based on this possible implementation, the first multi-link device and the second multi-link device may negotiate the first threshold in advance, and therefore the first threshold can be set for the second link more flexibly.

In a possible implementation, the first information includes multiple first thresholds, and each of the multiple first thresholds is corresponding to one link. Based on this possible implementation, each second link may be corresponding to one first threshold. This helps meet threshold requirements of different links.

In a possible implementation, before the first multi-link device sends the data frames to the second multi-link device over the multiple links, the first multi-link device may further receive indication information sent by the second multi-link device, where the indication information indicates whether a station on the first link in the second multi-link device can determine, within a time period of the first threshold after the second multi-link device receives the data frame over the second link, the receiving status of the data frame received over the second link. It can also be understood as: If the indication information indicates that after the second multi-link device receives the data frame over the second link, the station on the first link in the second multi-link device can determine, within the time period of the first threshold, the receiving status of the data frame received over the second link, it indicates that the second link supports the first threshold; otherwise, it indicates that the second link does not support the first threshold. Optionally, in this possible implementation, the first threshold may be a fixed value, for example, may be a fixed value pre-specified in a protocol. The first threshold is not necessarily supported by the second link. Based on this possible implementation, the first multi-link device can learn in advance whether the second link supports the first threshold, to determine whether to determine, based on the first threshold and the delay between the second time and the first time, the receiving status of the data frame corresponding to the first bit.

In a possible implementation, the transmission time of the data frame corresponding to the first bit is a sending end time of a downlink protocol data unit PPDU in which the data frame is located, or the transmission time of the data frame corresponding to the first bit is a sending end time of a symbol in which a last bit of the data frame is located. The sending end time of the downlink protocol data unit PPDU in which the data frame corresponding to the first bit is located or the sending end time of the symbol in which the last bit of the data frame corresponding to the first bit is located is used as the first time, to help improve accuracy of determining a receiving status of a data frame.

In a possible implementation, if the delay between the second time and the first time is greater than a second threshold, and the delay between the second time and the first time is less than the first threshold, the first multi-link device sends a block acknowledgment request BAR frame or a data frame to the second multi-link device before retransmitting the data frame corresponding to the first bit. If the delay between the second time and the first time is greater than the second threshold, and the delay between the second time and the first time is less than the first threshold, it indicates that the receiving status of the data frame corresponding to the first bit cannot be determined. In other words, the first bit has ambiguity. Based on this possible implementation, before the first multi-link device retransmits the data frame corresponding to the first bit, the ambiguity of the first bit can be first eliminated. The data frame corresponding to the first bit is retransmitted when it is determined that the data frame corresponding to the first bit fails to be received. This helps avoid a waste of transmission resources caused by retransmission of a successfully received data frame.

In a possible implementation, the BA frame includes a start sequence number of a data frame whose receiving status is fed back, the start sequence number is less than or equal to a first sequence number, and the first sequence number is a smallest value of sequence numbers of data frames that are not acknowledged to be received. Based on this possible implementation, the bitmap can indicate a receiving status of a data frame that is not acknowledged to be received.

In a possible implementation, the second multi-link device may send, to the first multi-link device, information about a capability of the second multi-link device to transmit a multi-link BA frame. The capability information may include one or more capability levels. The multi-link BA frame indicates that the BA frame includes receiving statuses of data frames transmitted over multiple links. Optionally, the capability information may be carried in an ADDBA (add block acknowledgment) response frame or an EHT capabilities information element of an association request (association request)/re-association request (re-association request)/authentication (authentication)/probe request (probe request) frame, to be sent to the first multi-link device. Based on this possible implementation, the first multi-link device can learn of the capability of the second multi-link device to transmit the multi-link BA frame. In this way, the first multi-link device parses, in a correct parsing manner, a receiving status of a data frame indicated by the bitmap in the BA frame.

In a possible implementation, the capability information may include one or more of the following three capability levels. An example in which the data frame is an MPDU is used.

Capability level 1: The second multi-link device does not support transmission of a multi-link BA frame. At this level, a BA frame carries only a receiving status of an MPDU sent over a same link, and does not carry a receiving status of an MPDU sent over another link.

Capability level 2: The second multi-link device supports transmission of a PPDU-based multi-link BA frame.

At this level, the BA frame carries a receiving status of an MPDU sent over a same link. In addition, the BA frame further carries a receiving status of an MPDU sent over another link that meets the following condition: A time interval between an end time of a PPDU in which the MPDU is located and a transmission time of the BA frame is greater than a first threshold. The first threshold may be pre-specified in a protocol. For example, the first threshold may be a multi-link inter frame space (multi-link inter frame space, MLIFS). The MLIFS may be a short inter-frame space (short inter-frame space, SIFS), a point coordination function inter frame space (PCF inter frame Space, PIFS), or a distributed inter-frame space (distributed inter-frame spacing, DIFS). Alternatively, the first threshold may be a time threshold M pre-negotiated by the first multi-link device and the second multi-link device. For example, at this level, the BA frame carries a receiving status of an MPDU sent over the first link. In addition, the BA frame further carries a receiving status of an MPDU sent over the second link that meets the following condition: A time interval between an end time of a PPDU in which the MPDU is located and a transmission time of the BA frame is greater than the first threshold.

Capability level 3: The second multi-link device supports transmission of an MPDU-based multi-link BA frame.

At this level, the BA frame carries a receiving status of an MPDU sent over a same link. In addition, the BA frame further carries a receiving status of an MPDU sent over another link that meets the following condition: A time interval between an end time of a last OFDM symbol in one or more OFDM symbols in which the MPDU is located and a transmission time of the BA frame is greater than the first threshold. For the first threshold at the capability level 3, refer to the description of the first threshold at the capability level 2. Details are not described herein again. At this level, the BA frame carries a receiving status of an MPDU sent over the first link. In addition, the BA frame further carries a receiving status of an MPDU sent over the second link that meets the following condition: A time interval between an end time of a last OFDM symbol in one or more OFDM symbols in which the MPDU is located and a transmission time of the BA frame is greater than the first threshold. Optionally, the transmission time of the BA frame at the capability level 2 and the capability level 3 may alternatively be replaced with a receiving time of the BA frame.

According to a second aspect, this application provides a method for determining a receiving status of a data frame. The method includes: A first multi-link device sends data frames to a second multi-link device over multiple links. The first multi-link device receives, over a first link in the multiple links, a block acknowledgment BA frame sent by the second multi-link device, where the BA frame carries a bitmap, and the bitmap indicates a receiving status of a data frame transmitted over the first link and a receiving status of a data frame transmitted over a second link in the multiple links. The first multi-link device determines a first data frame sent over the second link, where the first data frame is a data frame whose transmission time is the last in a data frame set, and the data frame set includes a data frame that is sent over the second link and that has been correctly received. The first multi-link device determines that a receiving status of a second data frame is receiving failure, where the second data frame is a data frame sent over the second link before the first data frame, and a bit value corresponding to the second data frame in the bitmap is a first value. Based on the method described in the second aspect, accuracy of determining a receiving status of a data frame is improved.

In a possible implementation, before retransmitting a third data frame, a block acknowledgment request BAR frame or a data frame is sent to the second multi-link device, where a bit value corresponding to the third data frame in the bitmap is the first value, and the third data frame is a data frame sent over the second link after the first data frame. Based on this possible implementation, before the first multi-link device retransmits the third data frame, ambiguity of the bit corresponding to the third data frame in the bitmap can be first eliminated. The third data frame is retransmitted when it is determined that the third data frame fails to be received. This helps avoid a waste of transmission resources caused by retransmission of a successfully received data frame.

In a possible implementation, the BA frame includes a start sequence number of a data frame whose receiving status is fed back, the start sequence number is less than or equal to a first sequence number, and the first sequence number is a smallest value of sequence numbers of data frames that are not acknowledged to be received. Based on this possible implementation, the bitmap can indicate a receiving status of a data frame that is not acknowledged to be received.

In a possible implementation, the data frame set includes data frames that are sent over multiple second links and that have been correctly received by the second link device. Based on this possible implementation, the first data frame can be determined from the data frames sent over the multiple second links, and there is no need to determine one first data frame for each second link. This helps reduce computing resources.

According to a third aspect, this application provides a block acknowledgment frame transmission method. The method includes: A first multi-link device sends data frames to a second multi-link device over multiple link. The first multi-link device sends a block acknowledgment request BAR frame to the second multi-link device, where the BAR frame carries first indication information, and the first indication information indicates a type of a requested block acknowledgment BA frame. The first multi-link device receives a first BA frame sent by the second multi-link device, where the first BA frame is a BA frame of the type indicated by the first indication information. Based on the method described in the third aspect, the first multi-link device can flexibly obtain different types of BA frames based on different requirements.

In a possible implementation, the first indication information is located in a BAR type field in the BAR frame.

Based on this possible implementation, the first indication information can be carried by using an existing field. This helps reduce bits of the BAR frame.

In a possible implementation, the BAR frame further includes second indication information, the second indication information indicates one or more links in the multiple links, and the first BA frame indicates a receiving status of a data frame sent over the one or more links. Based on this possible implementation, the first multi-link device can indicate, to the second multi-link device, that the second multi-link device needs to feed back receiving statuses of data frames sent over which links.

In a possible implementation, the first indication information indicates that the type of the requested BA frame is a multi-link BA frame, and an interval between a transmission end time of the data frames and a transmission start time of the BAR frame is greater than or equal to a preset time interval. The multi-link BA frame indicates that one BA frame includes receiving statuses of data frames sent over multiple links. Based on this possible implementation, ambiguity of a bit in a bitmap of the BA frame is eliminated.

In a possible implementation, before the first multi-link device sends the data frames to the second multi-link device over the multiple links, the first multi-link device may further receive a reply manner of a BA frame sent by the second multi-link device, where the reply manner of the BA frame is delayed reply or immediate reply. Based on this possible implementation, the first multi-link device can determine the reply manner of the BA frame sent by the second multi-link device.

In a possible implementation, a time interval between a transmission end time of the BAR frame and a transmission start time of the first BA frame is greater than a preset threshold. Based on this possible implementation, the second multi-link device has sufficient time to generate the BA frame.

In a possible implementation, there is a padding bit behind the BAR frame, and the padding bit enables the time interval between the transmission end time of the BAR frame and the transmission start time of the first BA frame to be greater than the preset threshold. Based on this possible implementation, the time interval between the transmission end time of the BAR frame and the transmission start time of the first BA frame can be greater than the preset threshold.

The method and the possible implementations described in the third aspect may be separately implemented, or the method and the possible implementations described in the third aspect may be combined with the method described in the first aspect or the second aspect. For example, in the method described in the first aspect or the second aspect, after the first multi-link device sends the data frames to the second multi-link device over the multiple links, and before the first multi-link device receives, over the first link in the multiple links, the block acknowledgment BA frame sent by the second multi-link device, the first multi-link device sends a block acknowledgment request BAR frame to the second multi-link device. The BAR frame carries first indication information, and the first indication information indicates that a type of a requested block acknowledgment BA frame is a multi-link BA frame. Optionally, the first indication information is located in the BAR type field in the BAR frame. Optionally, a value of the first indication information may be a reserved value of a BAR type field in an existing standard. Optionally, a new field may be added to the BAR frame, and the first indication information may alternatively be located in the new field in the BAR frame. Optionally, the BAR frame further includes second indication information, the second indication information indicates one or more second links in the multiple links, and a bitmap in the BA frame sent over the first link indicates receiving statuses of data frames sent over the first link and the one or more second links. Optionally, before the first multi-link device sends the data frames to the second multi-link device over the multiple links, the first multi-link device may further receive a reply manner of the BA frame sent by the second multi-link device, where the reply manner of the BA frame is delayed reply or immediate reply. Optionally, a time interval between a transmission end time of the BAR frame and a transmission start time of the BA frame is greater than a preset threshold. Optionally, there is a padding bit behind the BAR frame, and the padding bit enables the time interval between the transmission end time of the BAR frame and the transmission start time of the BA frame to be greater than the preset threshold.

According to a fourth aspect, this application provides a block acknowledgment frame transmission method. The method includes: A second multi-link device receives, over multiple links, data frames sent by a first multi-link device. The second multi-link device receives a block acknowledgment request BAR frame sent by the first multi-link device, where the BAR frame carries first indication information, and the first indication information indicates a type of a requested block acknowledgment BA frame. The second multi-link device sends a first BA frame to the first multi-link device, where the first BA frame is a BA frame of the type indicated by the first indication information.

In a possible implementation, the first indication information is located in a BAR type field in the BAR frame.

In a possible implementation, the BAR frame further includes second indication information, the second indication information indicates one or more links in the multiple links, and the first BA frame indicates a receiving status of a data frame sent over the one or more links.

In a possible implementation, the first indication information indicates that the type of the requested block acknowledgment BA frame is a multi-link BA frame, and an interval between a transmission end time of the data frames and a transmission start time of the BAR frame is greater than or equal to a preset time interval.

In a possible implementation, before the second multi-link device receives, over the multiple links, the data frames sent by the first multi-link device, the second multi-link device may further send a reply manner of a BA frame to the first multi-link device, where the reply manner of the BA frame is delayed reply or immediate reply.

In a possible implementation, a time interval between a transmission end time of the BAR frame and a transmission start time of the first BA frame is greater than a preset threshold.

In a possible implementation, there is a padding bit behind the BAR frame, and the padding bit enables the time interval between the transmission end time of the BAR frame and the transmission start time of the first BA frame to be greater than the preset threshold.

For beneficial effects of the fourth aspect, refer to beneficial effects of the third aspect. Details are not described herein.

According to a fifth aspect, this application provides a data frame transmission method. The method includes: A first multi-link device sends data frames to a second multi-link device over a first link and a second link, where a transmission end time of a PPDU in which the data frame transmitted over the first link is located is the same as a transmission end time of a PPDU in which the data frame transmitted over the second link is located. The first multi-link device sends a block acknowledgment request BAR frame to the second multi-link device over the first link and/or the second link, and the first multi-link device receives a BA frame over the first link and/or the second link. Based on the method described in the fifth aspect, the transmission end time of the data frame transmitted over the first link is the same as the transmission end time of the data frame transmitted over the second link. This helps avoid TXOP interruption.

In a possible implementation, there is a padding bit behind the data frame transmitted over the first link, and the padding bit enables the transmission end time of the PPDU in which the data frame transmitted over the first link is located to be the same as the transmission end time of the PPDU in which the data frame transmitted over the second link is located. Based on this possible implementation, the transmission end time of the data frame transmitted over the first link and the transmission end time of the data frame transmitted over the second link can be the same.

The method and the possible implementations described in the fifth aspect may be separately implemented, or the method and the possible implementations described in the fifth aspect may be combined with the method described in the first aspect, the second aspect, or the third aspect. For example, in the method described in the first aspect or the second aspect, the first multi-link device sends the data frames to the second multi-link device on the multiple links, where an end time of a PPDU in which a data frame sent over each link is located is the same. After the first multi-link device sends the data frames to the second multi-link device over the multiple links, and before the first multi-link device receives, over the first link in the multiple links, the block acknowledgment BA frame sent by the second multi-link device, the first multi-link device sends a BAR frame to the second multi-link device. Optionally, there is a padding bit behind a data frame sent over at least one link, and the padding bit enables the end time of the PPDU in which the data frame sent over each link is located is the same. For another example, in the method described in the third aspect, the first multi-link device sends the data frames to the second multi-link device on the multiple links, where an end time of a PPDU in which a data frame sent over each link is located is the same. The BAR frame sent by the first multi-link device to the second multi-link device indicates that the type of the BA frame is the multi-link BA frame. Optionally, there is a padding bit behind a data frame sent over at least one link, and the padding bit enables the end time of the PPDU in which the data frame sent over each link is located is the same.

According to a sixth aspect, this application provides a data frame transmission method. The method includes: A second multi-link device receives, over a first link and a second link, data frames sent by a first multi-link device, where a transmission end time of a PPDU in which the data frame transmitted over the first link is located is the same as a transmission end time of a PPDU in which the data frame transmitted over the second link is located. The second multi-link device receives, over the first link and/or the second link, a block acknowledgment request BAR frame sent by the first multi-link device. The second multi-link device sends a BA frame to the first multi-link device over the first link and/or the second link.

In a possible implementation, there is a padding bit behind the data frame transmitted over the first link, and the padding bit enables the transmission end time of the PPDU in which the data frame transmitted over the first link is located to be the same as the transmission end time of the PPDU in which the data frame transmitted over the second link is located.

For beneficial effects of the sixth aspect, refer to the beneficial effects of the fifth aspect. Details are not described herein.

According to a seventh aspect, a communication apparatus is provided. The apparatus may be a first multi-link device, or an apparatus in the first multi-link device, or an apparatus that can be used together with the first multi-link device. The communication apparatus may alternatively be a chip system. The communication apparatus may perform the method according to the first aspect, the second aspect, the third aspect, or the fifth aspect. A function of the communication apparatus may be implemented by hardware, or may be implemented by hardware by executing corresponding software. The hardware or the software includes one or more units corresponding to the foregoing function. The unit may be software and/or hardware. For operations performed by the communication apparatus and beneficial effects, refer to the method and beneficial effects described in the first aspect, the second aspect, the third aspect, or the fifth aspect. No repeated description is provided.

According to an eighth aspect, a communication apparatus is provided. The apparatus may be a second multi-link device, or an apparatus in the second multi-link device, or an apparatus that can be used together with the second multi-link device. The communication apparatus may alternatively be a chip system. The communication apparatus may perform the method according to the fourth aspect or the sixth aspect. A function of the communication apparatus may be implemented by hardware, or may be implemented by hardware by executing corresponding software. The hardware or the software includes one or more units corresponding to the foregoing function. The unit may be software and/or hardware. For operations performed by the communication apparatus and beneficial effects thereof, refer to the method according to the fourth aspect or the sixth aspect, and the beneficial effects thereof. No repeated description is provided.

According to a ninth aspect, this application provides a communication apparatus. The communication apparatus may be a first multi-link device or a chip system. The communication apparatus includes at least one processor. When the processor invokes a computer program in a memory, a method performed by the first multi-link device in the method according to first aspect, the second aspect, the third aspect, or the fifth aspect is performed.

According to a tenth aspect, this application provides a communication apparatus. The communication apparatus may be a second multi-link device or a chip system. The communication apparatus includes at least one processor. When the processor invokes a computer program in a memory, a method performed by the second multi-link device in the method according to the fourth aspect or the sixth aspect is performed.

According to an eleventh aspect, this application provides a communication apparatus. The communication apparatus may be a first multi-link device or a chip system. The communication apparatus includes a processor and a memory. The memory is configured to store a computer program. The processor is configured to execute the computer program stored in the memory, so that the communication apparatus performs a method performed by the first multi-link device in the method according to the first aspect, the second aspect, the third aspect, or the fifth aspect.

According to a twelfth aspect, this application provides a communication apparatus. The communication apparatus may be a second multi-link device or a chip system. The communication apparatus includes a processor and a memory. The memory is configured to store a computer program. The processor is configured to execute the computer program stored in the memory, so that the communication apparatus performs a method performed by the second multi-link device in the method according to the fourth aspect or the sixth aspect is performed.

According to a thirteenth aspect, this application provides a communication apparatus. The communication apparatus may be a first multi-link device. The communication apparatus includes a processor, a memory, and a transceiver. The transceiver is configured to receive a signal or send a signal. The memory is configured to store a computer program. The processor is configured to invoke the computer program from the memory, to perform a method performed by the first multi-link device in the method according to the first aspect, the second aspect, the third aspect, or the fifth aspect.

According to a fourteenth aspect, this application provides a communication apparatus. The communication apparatus may be a first multi-link device. The communication apparatus includes a processor, a memory, and a transceiver. The transceiver is configured to receive a signal or send a signal. The memory is configured to store a computer program. The processor is configured to invoke the computer program from the memory, to perform a method performed by the second multi-link device in the method according to the fourth aspect or the sixth aspect is performed.

According to a fifteenth aspect, this application provides a communication apparatus. The communication apparatus may be a first multi-link device or a chip system. The communication apparatus includes at least one processor and a communication interface. The processor runs a computer program, to perform a method performed by the first multi-link device in the method according to the first aspect, the second aspect, the third aspect, or the fifth aspect.

According to a sixteenth aspect, this application provides a communication apparatus. The communication apparatus may be a second multi-link device or a chip system. The communication apparatus includes at least one processor and a communication interface, and the communication interface is configured to receive a computer program and transmit the computer program to the processor. The processor runs the computer program to perform the method performed by the second multi-link device in the method according to the fourth aspect or the sixth aspect.

According to a seventeenth aspect, this application provides a computer-readable storage medium. The computer-readable storage medium is configured to store instructions. When the instructions are executed, a method performed by the first multi-link device in the method according to the first aspect, the second aspect, the third aspect, or the fifth aspect is implemented.

According to an eighteenth aspect, this application provides a computer-readable storage medium. The computer-readable storage medium is configured to store instructions. When the instructions are executed, a method performed by the second multi-link device in the method according to the fourth aspect or the sixth aspect is implemented.

According to a nineteenth aspect, this application provides a computer program product including instructions. When the instructions are executed, the method performed by the first multi-link device in the method according to the first aspect, the second aspect, the third aspect, or the fifth aspect is implemented.

According to a twentieth aspect, this application provides a computer program product including instructions. When the instructions are executed, the method performed by the second multi-link device in the method according to the fourth aspect or the sixth aspect is implemented.

BRIEF DESCRIPTION OF THE DRAWINGS

To describe the technical solutions in embodiments of the present invention or in the current technology more clearly, the following briefly describes the accompanying drawings used in describing embodiments or the current technology. It is clear that the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

Detailed descriptions are provided separately below.

In the specification, claims, and accompanying drawings of the present invention, the terms "first", "second", "third", "fourth", and so on are intended to distinguish between different objects but do not indicate a particular order. In addition, the terms "including", "having", and any other variant thereof are intended to cover a non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

An "embodiment" mentioned in this application means that a specific feature, structure, or characteristic described with reference to the embodiment may be included in at least one embodiment of the present invention. The phrase that occurs at different positions in the specification does not necessarily refer to a same embodiment, or an independent or alternative embodiment exclusive of another embodiment. A person skilled in the art understands, in explicit and implicit manners, that an embodiment described in this application may be combined with another embodiment.

"Multiple" means two or more than two. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following first describes a system architecture to which embodiments of this application may be applied.

Figure 1:
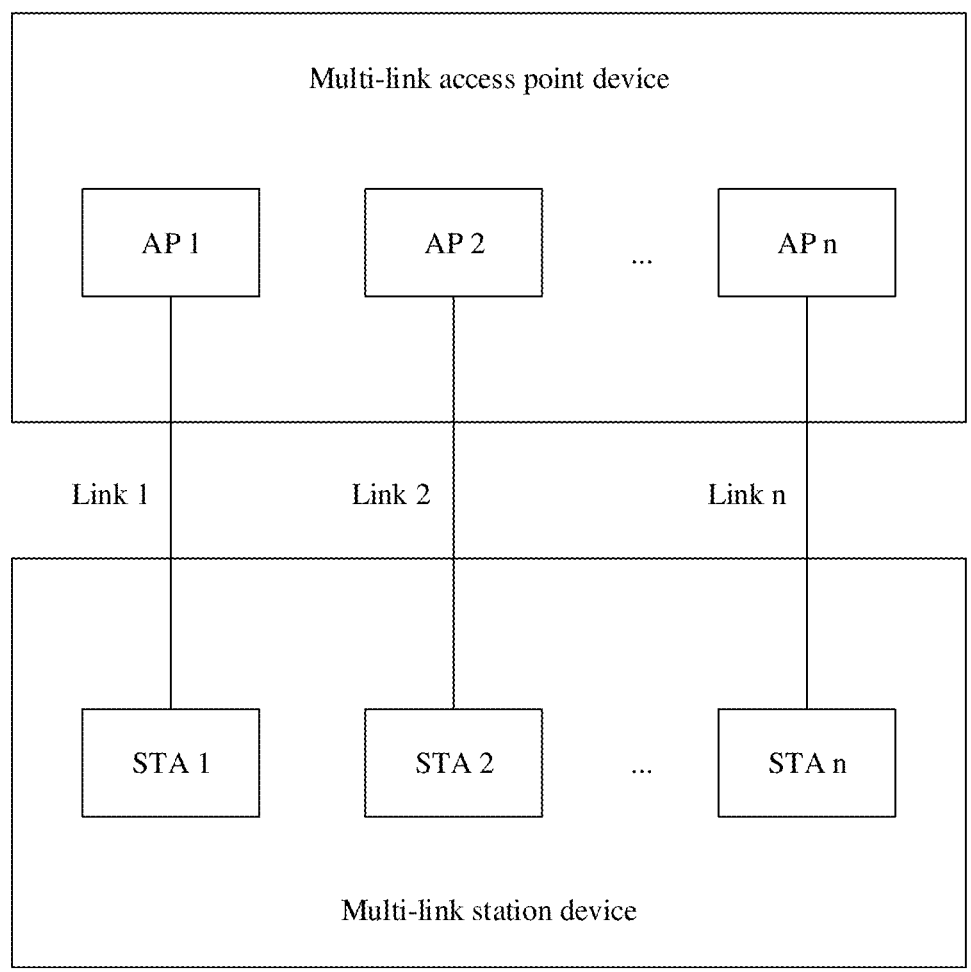
FIG. 1 is a schematic diagram of a multi-link device according to an embodiment of this application.
Figure 2:
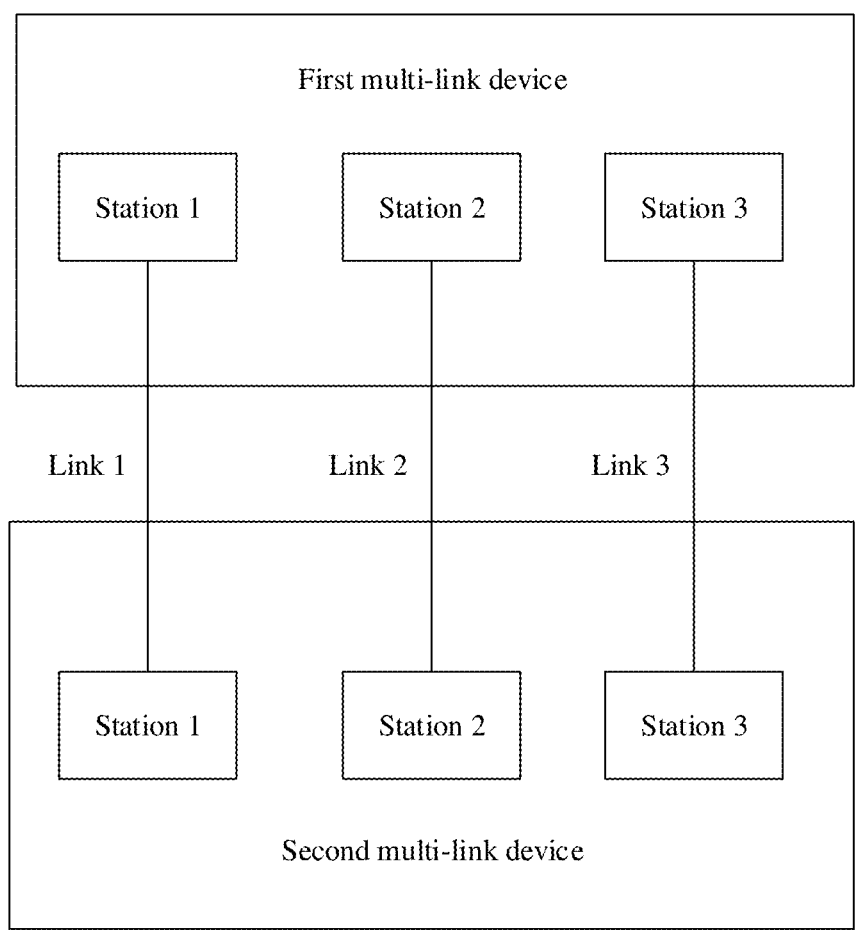
FIG. 2 is a schematic diagram of a system architecture according to an embodiment of this application.

FIG. 2 is a schematic diagram of a system architecture according to an embodiment of this application. As shown in FIG. 2, the system architecture includes a first multi-link device and a second multi-link device. The first multi-link device is an access point (access point, AP), and the second multi-link device is a non-access point station (non-access point station, non-AP STA). Alternatively, the first multi-link device is a non-AP STA, and the second multi-link device is an AP. Alternatively, both the first multi-link device and the second multi-link device are non-AP STAs. The first multi-link device includes multiple stations, and the second multi-link device includes multiple stations. Each station in the first multi-link device or the second multi-link device works on a specific frequency band or channel. The multiple stations in the first multi-link device may be located in different geographical locations, or the multiple stations are located in a same physical device. The multiple stations in the second multi-link device may be located in different geographical locations, or the multiple stations are located in a same physical device. There are multiple links between the first multi-link device and the second multi-link device. As shown in FIG. 2, a link between a station 1 in the first multi-link device and a station 1 in the second multi-link device is a link 1. A link between a station 2 in the first multi-link device and a station 2 in the second multi-link device is a link 2. A link between a station 3 in the first multi-link device and a station 3 in the second multi-link device is a link 3. An example in which there are three links between the first multi-link device and the second multi-link device in FIG. 2 is used for description. Certainly, there may alternatively be two or more than three links between the first multi-link device and the second multi-link device.

The AP may be an AP used by a terminal device (for example, a mobile phone) to access a wired (or wireless) network, and is mainly deployed at home, in a building, and in a park. A typical coverage radius is tens of meters to a hundred meters. Certainly, the access point may also be deployed outdoors. The AP is equivalent to a bridge that connects the wired network and a wireless network. The AP is mainly used to connect wireless network clients to each other, and then connect the wireless network to the Ethernet. Specifically, the AP may be a terminal device (such as a mobile phone) or a network device (such as a router) with a wireless fidelity (wireless fidelity, Wi-Fi) chip. The AP may be a device that supports the 802.11be standard. The AP may alternatively be a device that supports multiple current and future wireless local area network (wireless local area network, WLAN) 802.11 family standards, such as 802.11ax, 802.11ac, 802.11n, 802.11g, 802.11b, and 802.11a.

The non-AP STA may be a wireless communication chip, a wireless sensor, a wireless communication terminal, or the like. For example, the non-AP STA may be a mobile phone that supports a Wi-Fi communication function, a tablet computer that supports a Wi-Fi communication function, a set top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. Optionally, the non-AP STA may support the 802.11be standard. The non-AP STA may also support multiple current and future wireless local area network (wireless local area network, WLAN) standards of the 802.11 family standards, such as 802.11ax, 802.11ac, 802.11n, 802.11g, 802.11b, and 802.11a.

For example, the AP and the non-AP STA may be devices applied to an Internet of Vehicles, Internet of Things nodes, sensors, or the like in an Internet of Things (Internet of Things, IoT), smart cameras, smart remote controls, smart water or electricity meters, or the like in a smart home, or sensors in a smart city.

The first multi-link device may send data frames to the second multi-link device over multiple links. The data frame may be a media access control (Media Access Control, MAC) protocol data unit (MAC protocol data unit, MPDU). After receiving the data frame, the second multi-link device needs to feed back a receiving status of the data frame to the first multi-link device by using a BA frame. The receiving status may be a receiving success or receiving failure. The receiving status may also be referred to as an acknowledgment status. The first multi-link device determines, based on the receiving status of the data frame, whether to retransmit the data frame to the second multi-link device. Generally, the second multi-link device may include, in a BA frame sent over a link, receiving statuses of data frames transmitted over the link and another link. The BA frame may be referred to as a multi-link BA frame. Currently, the first multi-link device may not accurately determine, based on the multi-link BA frame, receiving statuses of data frames transmitted over some links. The first multi-link device may determine a receiving status of a data frame that has been successfully received by the second multi-link device as receiving failure. This causes unnecessary retransmission of the data frame.

The following uses a specific example to describe a reason why the first multi-link device cannot accurately determine, based on the multi-link BA frame, the receiving statuses of the data frames transmitted over some links.

Figure 3:
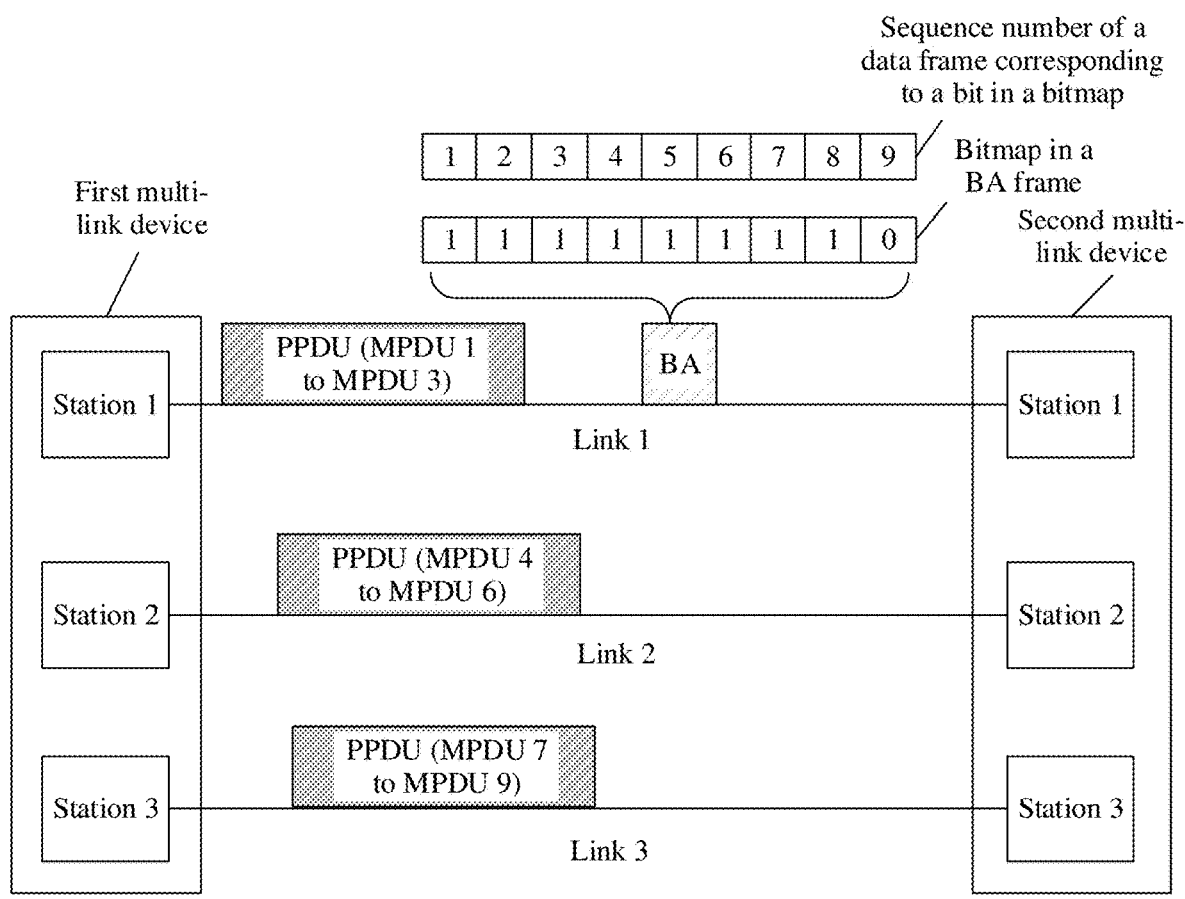
FIG. 3 is a schematic diagram of transmission of a data frame and a BA frame according to an embodiment of this application.

For example, the data frame is an MPDU. As shown in FIG. 3, the first multi-link device sends an MPDU 1 to an MPDU 3 to the second multi-link device over the link 1, sends an MPDU 4 to an MPDU 6 to the second multi-link device over the link 2, and sends an MPDU 7 to an MPDU 9 to the second multi-link device over the link 3. The station 1 of the first multi-link device may aggregate the MPDU 1 to the MPDU 3 into an A-MPDU, include the A-MPDU in a PPDU, and send the PPDU to the station 1 of the second multi-link device. The station 2 of the first multi-link device may aggregate the MPDU 4 to the MPDU 6 into an A-MPDU, include the A-MPDU in a PPDU, and send the PPDU to the station 2 of the second multi-link device. The station 3 of the first multi-link device may aggregate the MPDU 7 to the MPDU 9 into an A-MPDU, include the A-MPDU in a PPDU, and send the PPDU to the station 3 of the second multi-link device. The second multi-link device sends a BA frame to the first multi-link device over the link 1, where the BA frame carries a bitmap. The bitmap includes nine bits, and bit values of the nine bits are 1111110. A $1^{st}$ bit is corresponding to the MPDU 1, a $2^{nd}$ bit is corresponding to the MPDU 2, . . . , and by analogy, a $9^{th}$ bit is corresponding to the MPDU 9. The station 1 corresponding to the link 1 in the second multi-link device sets a bit value corresponding to a correctly received MPDU to 1, and sets bit values corresponding to remaining MPDUs to 0. After receiving the BA frame, the first multi-link device determines that the MPDU corresponding to the bit value 1 is successfully received, but cannot accurately determine a receiving status of the MPDU 9 corresponding to a bit value 0. A bit whose value is 0 has ambiguity. A reason is as follows: The station 1 in the second multi-link device needs to generate the BA frame that includes receiving statuses of MPDUs of multiple links. After receiving MPDUs, the station 2 and the station 3 in the second multi-link device need to transfer receiving statuses of the MPDUs to the station 1 in the second multi-link device, so that the station 1 in the second multi-link device generates a BA frame including receiving statuses of MPDUs transmitted over the link 1 to the link 3. Due to a transmission delay, when the station 1 in the second multi-link device generates the BA frame, although the station 2 in the second multi-link device has successfully received the MPDU 9, the station 2 may have not yet transferred the receiving status of the MPDU 9 to the station 1 in the second multi-link device. Because the receiving status of the MPDU 9 is not received, the station 1 in the second multi-link device sets the bit value corresponding to the MPDU 9 to 0. A delay problem is especially obvious in a non-collocated scenario. In the non-collocated scenario, the second multi-link device is a logical device, and the station 1 and the station 2 in the second multi-link device are located in different geographical locations and different physical devices. The station 1 and the station 2 in the second multi-link device may be connected through a wired cable or in another manner (a specific wireless technology). In other words, when either the following two cases occurs, the second multi-link device sets the bit corresponding to the MPDU 9 to 0. In one case, the MPDU 9 fails to be received. In the other case, the station 2 of the second multi-link device does not send the receiving status of the MPDU 9 to the station 1 of the second multi-link device in time. Therefore, when the bit value corresponding to the MPDU 9 is 0, ambiguity exists. In one case, it indicates that the receiving status of the MPDU 9 is receiving failure. In the other case, it indicates that the receiving status of the MPDU 9 is not carried. The first multi-link device cannot accurately determine whether the receiving status of the MPDU 9 is the receiving failure or the station 2 of the second multi-link device does not send the receiving status of the MPDU 9 to the station 1 of the second multi-link device in time.

To improve accuracy of a determined receiving status of a data frame and avoid unnecessary retransmission of the data frame by the first multi-link device, embodiments of this application provide a method for determining a receiving status of a data frame and a first multi-link device. The following further describes the method for determining a receiving status of a data frame and the first multi-link device that are provided in this application.

Figure 4:
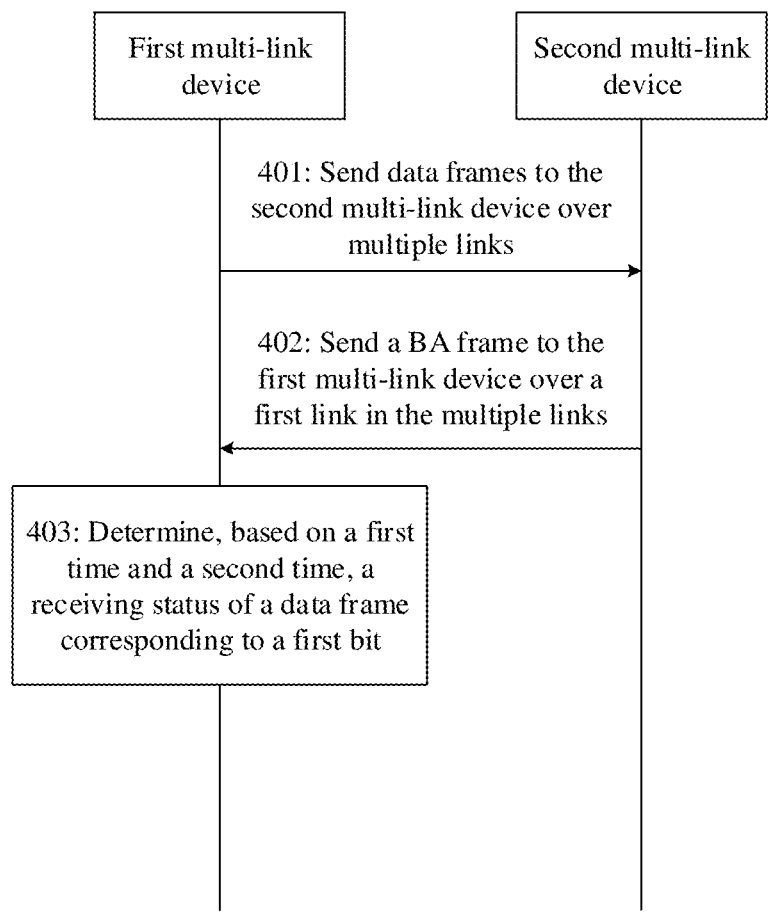
FIG. 4 is a schematic flowchart of determining a receiving status of a data frame according to an embodiment of this application.

FIG. 4 is a schematic flowchart of a method for determining a receiving status of a data frame according to an embodiment of this application. As shown in FIG. 4, the method for determining a receiving status of a data frame includes the following step 401 to step 403. The method shown in FIG. 4 may be performed by a first multi-link device and a second multi-link device. Alternatively, the method shown in FIG. 4 may be executed by a chip in the first multi-link device and a chip in the second multi-link device. FIG. 4 is described by using an example in which the first multi-link device and the second multi-link device are used as execution bodies.

401: The first multi-link device sends data frames to the second multi-link device over multiple links.

In this embodiment of this application, at least two stations in the first multi-link device separately send data frames to at least two stations in the second multi-link device over links on which the at least two stations work. The data frames may be sent synchronously or asynchronously over the different links.

Figure 5:
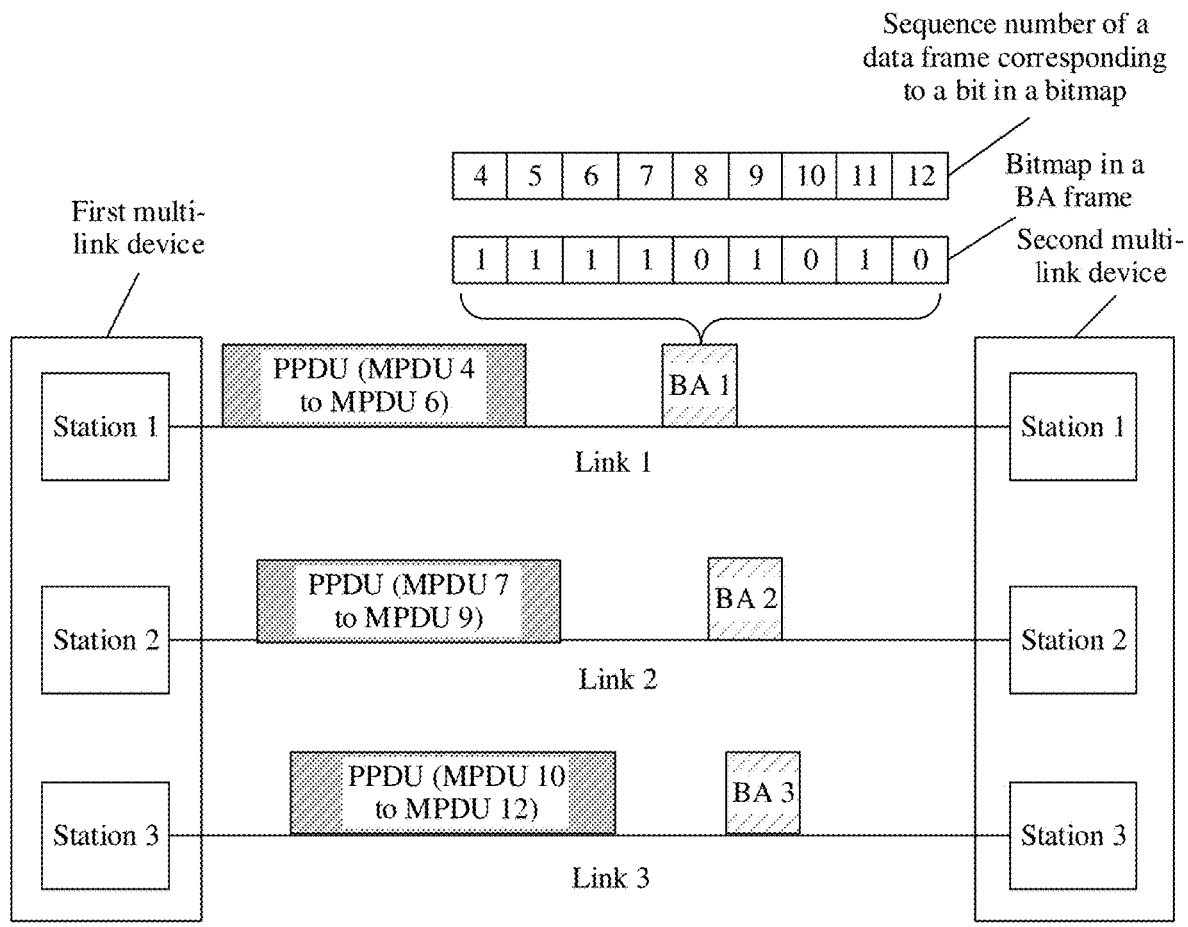
FIG. 5 is another schematic diagram of transmission of a data frame and a BA frame according to an embodiment of this application.

For example, the data frames are MPDUs. As shown in FIG. 5, the first multi-link device sends an MPDU 4 to an MPDU 6 to the second multi-link device over the link 1, sends an MPDU 7 to an MPDU 9 to the second multi-link device over the link 2, and sends an MPDU 10 to an MPDU 12 to the second multi-link device over the link 3. A station 1 of the first multi-link device may aggregate the MPDU 4 to the MPDU 6 into an A-MPDU, include the A-MPDU in a PPDU, and send the PPDU to a station 1 of the second multi-link device. A station 2 of the first multi-link device may aggregate the MPDU 7 to the MPDU 9 into an A-MPDU, include the A-MPDU in a PPDU, and send the PPDU to a station 2 of the second multi-link device. A station 3 of the first multi-link device may aggregate the MPDU 10 to the MPDU 12 into an A-MPDU, add the A-MPDUs to a PPDU, and send the PPDU to a station 3 of the second multi-link device. Sequence numbers (sequence number) of the MPDUs sent over the links may be consecutive, or may be inconsecutive.

402: The second multi-link device sends a block acknowledgment (block ACK, BA) frame to the first multi-link device over a first link in the multiple links.

In this embodiment of this application, after receiving, over the multiple links, the data frames sent by the first multi-link device, the second multi-link device may reply with the BA frame to the first multi-link device over one or more of the multiple links. In this specification, the first link is any link over which the BA frame is replied. A BA frame replied over the first link carries a bitmap, and the bitmap indicates a receiving status of a data frame transmitted over the first link and indicates a receiving status of a data frame transmitted over a second link in the multiple links. In other words, the BA frame replied over the first link is a multi-link BA frame. The second link is a link in the multiple links other than the first link. The bitmap may be specifically used to indicate a receiving status of a data frame transmitted over one or more second links. Bits in the bitmap are in a one-to-one correspondence with the data frames. A bit corresponding to a data frame indicates a receiving status of the data frame.

In a possible implementation, the BA frame includes a start sequence number of a data frame whose receiving status is fed back, the start sequence number is less than or equal to a first sequence number, and the first sequence number is a smallest value of sequence numbers of data frames that are not acknowledged to be received. Optionally, the first sequence number may alternatively be set to a value less than a smallest value of sequence numbers of data frames that are not acknowledged to be received. Optionally, the data frames that are not acknowledged to be received include a sent data frame whose receiving status has not been fed back, a sent data frame that fails to be received, and a sent data frame whose receiving status cannot be accurately determined. The bits in the bitmap are in a one-to-one correspondence with the data frames. A data frame whose sequence number is X is corresponding to a (X−first sequence number+1)$^{th}$ bit. For example, if the first sequence number is K, a 1$^{st}$ bit in the bitmap is corresponding to a data frame K, a 2$^{nd}$ bit is corresponding to a data frame K+1, a 3$^{rd}$ bit is corresponding to a data frame K+2, and the rest may be deduced by analogy. Optionally, the BA frame may further carry a length of the bitmap. Alternatively, the bitmap does not carry a length of the bitmap, and the length of the bitmap may be fixed. For example, the fixed length of the bitmap is 64 or 256.

For example, as shown in FIG. 5, after receiving the MPDUs over the multiple links, the second multi-link device sends a BA frame 1 over the link 1. A bitmap of the BA frame 1 indicates a receiving status of an MPDU transmitted over the link 1 and receiving statuses of MPDUs transmitted over the link 2 and the link 3. The second multi-link device acknowledges that an MPDU 1 to an MPDU 3 are all successfully received. Therefore, a start sequence number of an MPDU carried in the BA frame 1 is 4, and a length of the bitmap carried in the BA frame 1 is 9. A sequence number of an MPDU corresponding to a 1$^{st}$ bit in the bitmap is 4, a sequence number of an MPDU corresponding to a 2$^{nd}$ bit in the bitmap is 5, . . . , and a sequence number of an MPDU corresponding to a 9$^{th}$ bit in the bitmap is 12. If the station 1 of the second multi-link device determines that an MPDU is successfully received, a value of a bit corresponding to the MPDU may be set to 1. If the station 1 of the second multi-link device determines that the MPDU fails to be received or the station 1 of the second multi-link device has not determined a receiving status of the MPDU, the value of the bit corresponding to the MPDU may be set to 0. Alternatively, if the station 1 of the second multi-link device determines that an MPDU is successfully received, a value of a bit corresponding to the MPDU may be set to 0. If the station 1 of the second multi-link device determines that the MPDU fails to be received or the station 1 of the second multi-link device has not determined a receiving status of the MPDU, the value of the bit corresponding to the MPDU may be set to 1. In FIG. 5, for example, if the station 1 of the second multi-link device determines that an MPDU is successfully received, a value of a bit corresponding to the MPDU is 1; otherwise, a value of a bit corresponding to the MPDU is 0.

To further enhance reliability of a receiving status of a data frame, the second multi-link device further sends a BA frame 2 over the link 2, and sends a BA frame 3 over the link 3. A bitmap of the BA frame 2 indicates a receiving status of an MPDU transmitted over the link 2 and receiving statuses of MPDUs transmitted over the link 1 and the link 3. A bitmap of the BA frame 3 indicates a receiving status of an MPDU transmitted over the link 3 and receiving statuses of MPDUs transmitted over the link 1 and the link 2. Generation principles of the BA frame 2 and the BA frame 3 are the same as a generation principle of the BA frame 1. The first multi-link device determines the receiving status of the data frame by parsing one or more of the BA frame 1, the BA frame 2, and the BA frame 3. A principle thereof is similar to the foregoing principle of determining the receiving status of the data frame by using the BA frame 1, and details are not described herein again.

In a possible implementation, the second multi-link device includes one or more scoreboards (scoreboards). The scoreboard is used for recording information about a receiving status of a data frame. For example, the second multi-link device includes multiple scoreboards, each link is corresponding to one scoreboard, and the scoreboard is used for recording a receiving status of a data frame transmitted over a corresponding link. Alternatively, the second multi-link device includes a scoreboard, and the scoreboard is used for recording receiving statuses of the data frames transmitted over all the links.

Figure 17:
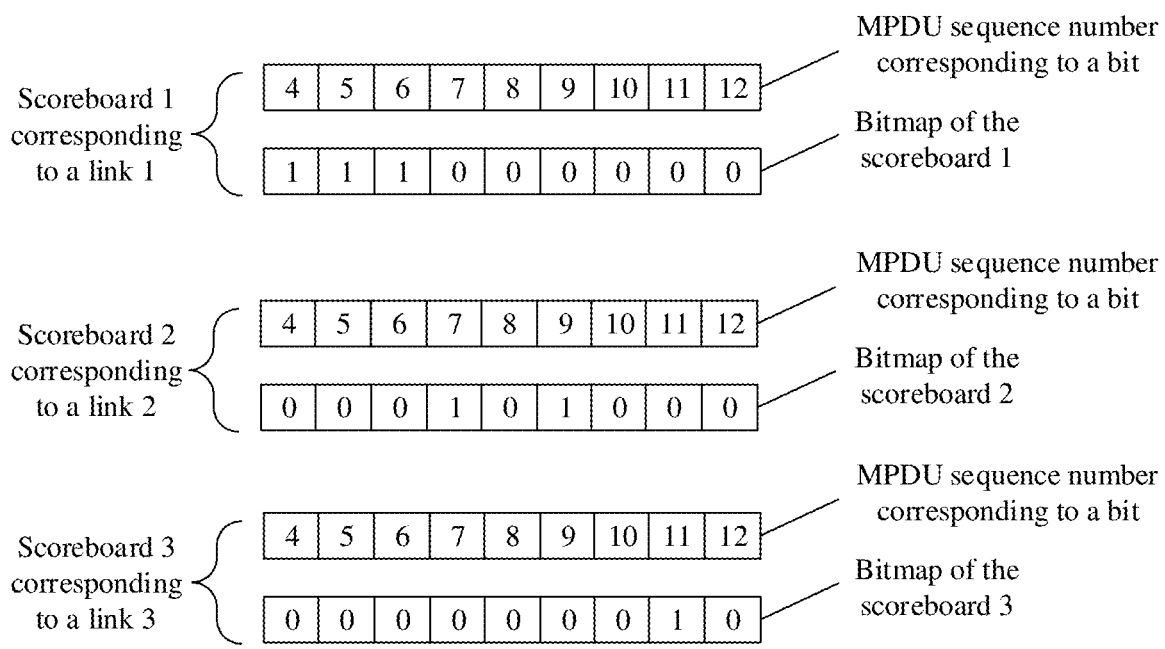
FIG. 17 is a schematic diagram of a scoreboard according to an embodiment of this application.

For example, each link of the second link device is corresponding to one scoreboard. As shown in FIG. 17, the link 1 of the second link device is corresponding to a scoreboard 1, the link 2 is corresponding to a scoreboard 2, and the link 3 is corresponding to a scoreboard 3. The scoreboard 1 to the scoreboard 3 each have nine bits. A 1$^{st}$ bit is corresponding to the MPDU 4, a 2$^{nd}$ bit is corresponding to the MPDU 5, . . . , and by analogy, a 9$^{th}$ bit is corresponding to the MPDU 12. The first three bits of the scoreboard 1 are used for recording receiving statuses of the MPDU 4 to the MPDU 6 transmitted over the link 1. If the MPDU is successfully received, a corresponding bit is set to 1; otherwise, a corresponding bit is set to 0. Values of the 4$^{th}$ bit to the 9$^{th}$ bit of the scoreboard 1 are 0. The 4$^{th}$ bit to the 6$^{th}$ bit of the scoreboard 2 are used for recording receiving statuses of the MPDU 7 to the MPDU 9 transmitted over the link 2, and values of other bits are 0. The 7$^{th}$ bit to the 9$^{th}$ bit of the scoreboard 3 are used for recording receiving statuses of the MPDU 10 to the MPDU 12 transmitted over the link 3, and values of other bits are 0. When the station 1 of the second link device generates the BA frame 1, the station 1 of the second link device obtains the receiving statuses of the MPDU 7 to the MPDU 9 from the scoreboard 2, and obtains the receiving statuses of the MPDU 10 to the MPDU 12 from the scoreboard 3. The station 1 generates the BA frame 1 based on the receiving statuses of the MPDU 4 to the MPDU 6 and the receiving statuses of the MPDU 7 to the MPDU 12 that are recorded by the scoreboard 1.

Figure 18:
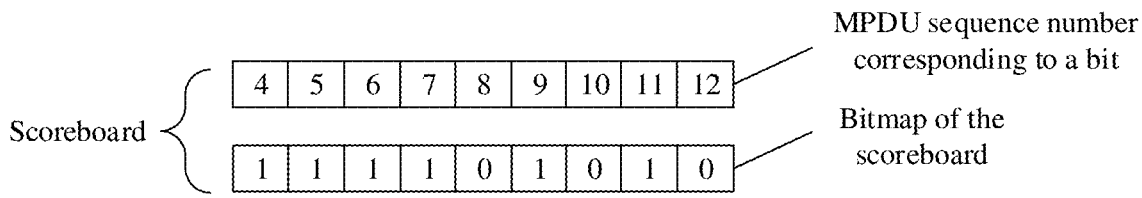
FIG. 18 is a schematic diagram of another scoreboard according to an embodiment of this application.

For another example, the second link device has only one scoreboard. As shown in FIG. 18, the second link device has a scoreboard, and the scoreboard has nine bits. A $1^{st}$ bit is corresponding to the MPDU 4, a $2^{nd}$ bit is corresponding to the MPDU 5, . . . , and by analogy, a $9^{th}$ bit is corresponding to the MPDU 12. The first three bits of the scoreboard are used for recording receiving statuses of the MPDU 4 to the MPDU 6 transmitted over the link 1. If the MPDU is successfully received, a corresponding bit is set to 1; otherwise, a corresponding bit is set to 0. The $4^{th}$ bit to the $6^{th}$ bit of the scoreboard are used for recording receiving statuses of the MPDU 7 to the MPDU 9 transmitted over the link 2. The $7^{th}$ bit to the $9^{th}$ bit of the scoreboard are used for recording receiving statuses of the MPDU 10 to the MPDU 12 transmitted over the link 3. When the station 1 of the second link device generates the BA frame 1, the station 1 of the second link device obtains the recorded receiving statuses of the MPDU 4 to the MPDU 6 from the scoreboard, to generate the BA frame 1 based on the receiving statuses of the MPDU 4 to the MPDU 12.

The second multi-link device may reply with the BA frame in either of the following two manners. Certainly, the second multi-link device may alternatively reply with the BA frame in another manner. This is not limited in this embodiment of this application.

Manner 1: After receiving the data frame over the first link, the second multi-link device may send the BA frame to the first multi-link device over the first link at a fixed time interval. The fixed time interval may be a short inter-frame space (short interframe space, SIFS).

Manner 2: After the first multi-link device sends the data frames to the second multi-link device over the multiple links, the first multi-link device sends a BAR frame to the second multi-link device over the first link. After receiving the BAR frame over the first link, the second multi-link device sends the BA frame to the first multi-link device over the first link.

403: The first multi-link device determines, based on a first time and a second time, a receiving status of a data frame corresponding to a first bit.

In this embodiment of this application, after receiving the block acknowledgment BA frame sent by the second multi-link device over the first link in the multiple links, the first multi-link device determines, based on the first time and the second time, the receiving status of the data frame corresponding to the first bit, where the first time is a transmission time of the data frame corresponding to the first bit, and the second time is a receiving time of the BA frame. The data frame corresponding to the first bit is sent over the second link, and a bit value corresponding to the first bit is a second value.

A corresponding bit to a data frame in the bitmap may have the following four cases.

Case 1: A data frame corresponding to the bit is sent over the first link. In this case, if a value of the bit is 1, it indicates that the data frame corresponding to the bit is successfully received. If the value of the bit is 0, it indicates that the data frame corresponding to the bit fails to be received. Alternatively, if a value of the bit is 0, it indicates that the data frame corresponding to the bit is successfully received. If the value of the bit is 1, it indicates that the data frame corresponding to the bit fails to be received.

Case 2: A data frame corresponding to the bit has not been sent. In this case, a value of the bit indicates that the data frame corresponding to the bit has not been sent. Because the data frame is sent by the first multi-link device, the first multi-link device can determine which data frames have been sent. For example, if the data frame corresponding to the bit has not been sent, a value of the bit is 0.

Case 3: A data frame corresponding to the bit is sent over the second link, and a bit value corresponding to the bit is the second value. The second value is a value set by the second multi-link device for a bit corresponding to the data frame when determining that the data frame is successfully received. In this case, the first multi-link device determines that the data frame corresponding to the bit is successfully received. A first value is different from the second value. For example, the second value is 1, and the first value is 0. Alternatively, the second value is 0, and the first value is 1.

Case 4: A data frame corresponding to the bit is sent over the second link, and a bit value corresponding to the bit is a first value. In this case, the bit is the first bit. The second multi-link device may use the bit value corresponding to the bit as the first value because the data frame corresponding to the bit fails to be received, or may use the bit value corresponding to the bit as the first value because the station on the first link in the second multi-link device does not obtain a receiving status of the data frame corresponding to the bit. In this case, the first multi-link device determines, based on the first time and the second time, the receiving status of the data frame corresponding to the bit. In this embodiment of this application, how the first multi-link device determines the receiving status of the data frame corresponding to the first bit in the case 4 is mainly described.

In a possible implementation, the transmission time of the data frame corresponding to the first bit is a sending end time of a downlink protocol data unit (PHY protocol data unit, PPDU) in which the data frame is located, or the transmission time of the data frame corresponding to the first bit is a sending end time of a symbol in which a last bit of the data frame is located. The sending end time of the downlink protocol data unit PPDU in which the data frame corresponding to the first bit is located or the sending end time of the symbol in which the last bit of the data frame corresponding to the first bit is located is used as the first time, to help improve accuracy of determining a receiving status of a data frame.

In a possible implementation, a specific implementation in which the first multi-link device determines, based on the first time and the second time, the receiving status of the data frame corresponding to the first bit is: If a delay between the second time and the first time is greater than or equal to a first threshold, the first multi-link device determines that the receiving status of the data frame corresponding to the first bit is receiving failure.

Before the second multi-link device generates the BA frame, a station on the second link in the second multi-link device has sufficient time to transfer the receiving status of the data frame corresponding to the first bit to a station on the first link in the second multi-link device. Therefore, if the delay between the second time and the first time is greater than or equal to the first threshold, in addition to the sufficient time, if a receiving status of a data frame transmitted by a station on the second link to a station on the first link in the first multi-link device is not a success, it may be determined that the receiving status of the data frame corresponding to the first bit is the receiving failure. It can be learned that, based on this possible implementation, the receiving failure status of the data frame corresponding to the first bit can be accurately determined.

The following further describes the delay between the second time and the first time.

In a possible implementation, T=t2−t1−2*t3. T is the delay between the second time and the first time, t2 is the second time (namely, the receiving time of the BA frame), t1 is the first time (namely, the transmission time of the data frame corresponding to the first bit), and t3 is a propagation delay between the first multi-link device and the second multi-link device. To be specific, when T=t2−t1−2*t3, the delay between the second time and the first time is duration between a receiving time of the data frame corresponding to the first bit and a transmission time of the BA frame. Alternatively, T may be equal to f(t2−t1−2*t3), and f( ) indicates that T is a function of (t2−t1−2*t3). If (t2−t1−2*t3) or f(t2−t1−2*t3) is greater than the first threshold, it indicates that before the second multi-link device generates the BA frame, a station on the second link in the second multi-link device has sufficient time to transfer the receiving status of the data frame corresponding to the first bit to a station on the first link in the second multi-link device. Therefore, if (t2−t1−2*t3) or f(t2−t1−2*t3) is greater than or equal to the first threshold, the first multi-link device determines that the receiving status of the data frame corresponding to the first bit is receiving failure. (t2−t1−2*t3) or f(t2−t1−2*t3) is used as the delay between the second time and the first time, to help improve accuracy of determining a receiving status of a data frame.

Optionally, the receiving time of the data frame corresponding to the first bit may be a receiving end time of a PPDU in which the data frame is located, or the receiving time of the data frame corresponding to the first bit is a receiving end time of a symbol in which a last bit of the data frame is located.

In a possible implementation, T=t2−t1−t3. T is the delay between the second time and the first time, t2 is the second time, t1 is the first time, and t3 is a propagation delay between the first multi-link device and the second multi-link device. To be specific, when T=t2−t1−t3, the delay between the second time and the first time is duration between the transmission time of the data frame corresponding to the first bit and a transmission time of the BA frame, or duration between a receiving time of the data frame corresponding to the first bit and the receiving time of the BA frame. Alternatively, T=f(t2−t1−t3), and f( ) indicates that T is a function of (t2−t1−t3). If (t2−t1−t3) or f(t2−t1−t3) is greater than the first threshold, it indicates that before the second multi-link device generates the BA frame, a station on the second link in the second multi-link device has sufficient time to transfer the receiving status of the data frame corresponding to the first bit to a station on the first link in the second multi-link device. Therefore, (t2−t1−t3) or f(t2−t1−t3) is used as the delay between the second time and the first time, to help improve accuracy of determining a receiving status of a data frame.

In a possible implementation, T=t2−t1 or T=f(t2−t1). T is the delay between the second time and the first time, t2 is the second time, t1 is the first time, and f( ) indicates that T is a function of (t2−t1). To be specific, when T=t2−t1, the delay between the second time and the first time is duration between the transmission time of the data frame corresponding to the first bit and the receiving time of the BA frame. If (t2−t1) or f(t2−t1) is greater than the first threshold, it indicates that before the second multi-link device generates the BA frame, a station on the second link in the second multi-link device has sufficient time to transfer the receiving status of the data frame corresponding to the first bit to a station on the first link in the second multi-link device. Therefore, (t2−t1) or f(t2−t1) is used as the delay between the second time and the first time, to help improve accuracy of determining a receiving status of a data frame.

The following further describes the first threshold.

The first multi-link device may obtain the first threshold in either of the following two manners. Alternatively, the first multi-link device may obtain the first threshold in another manner. This is not limited in this embodiment of this application.

Manner 1: The first threshold is pre-negotiated between the first multi-link device and the second multi-link device. In the manner 1, before sending the data frame to the second multi-link device over the multiple links, the first multi-link device may receive first information sent by the second multi-link device, where the first information carries the first threshold. Optionally, the first information may be an ADDBA (add block acknowledgment) response frame or an EHT capability information element of an association request (association request)/re-association request (re-association request)/authentication (authentication)/probe request (probe request) frame.

Figure 6:
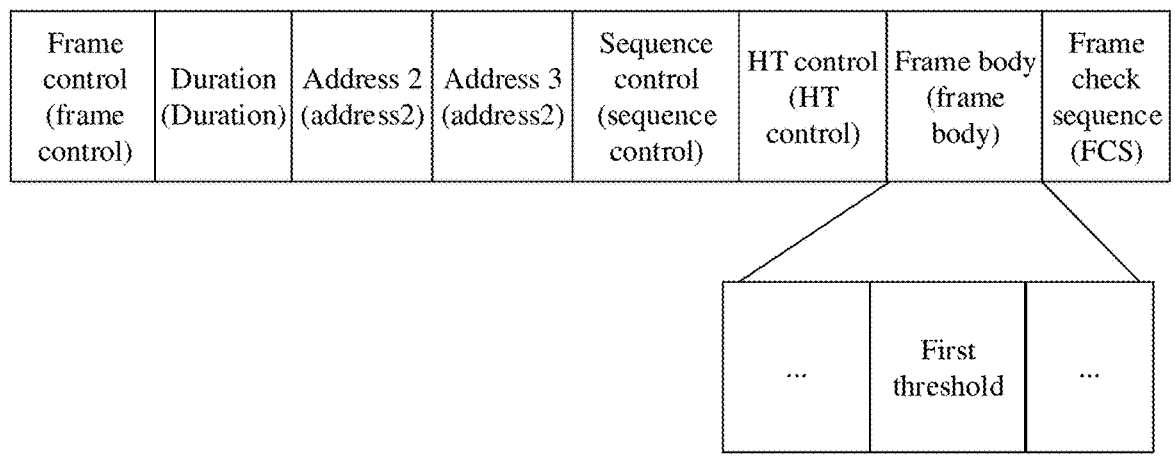
FIG. 6 is a schematic diagram of a structure of an ADDBA response frame according to an embodiment of this application.

For example, before sending the data frame to the second multi-link device over the multiple links, the first multi-link device may first send an ADDBA request frame to the second multi-link device. After receiving the ADDBA request frame, the second multi-link device sends an ADDBA response frame to the first multi-link device. The first information may be the ADDBA response frame, and the ADDBA response frame carries the first threshold. For example, as shown in FIG. 6, the second multi-link device may add a field to a frame body (frame body) field in the ADDBA response frame to carry the first threshold. Alternatively, the second multi-link device may include the first threshold in another field in the ADDBA response frame.

In a possible implementation, the multiple links are corresponding to the same first threshold. In other words, the first information includes only one first threshold. The same first threshold is used when a receiving status of a data frame on each link is determined.

Figure 7:
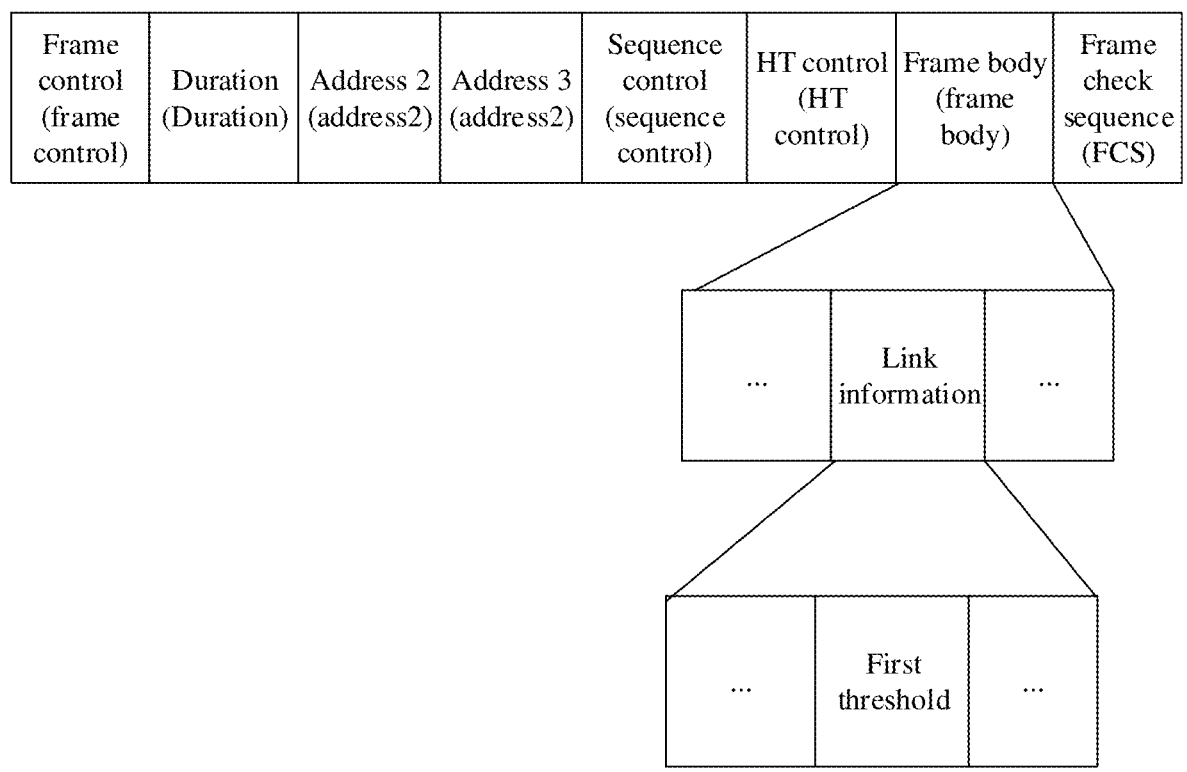
FIG. 7 is a schematic diagram of a structure of another ADDBA response frame according to an embodiment of this application.

In a possible implementation, the first information includes multiple first thresholds, and one first threshold is corresponding to one link. The first multi-link device determines, based on the first time, the second time, and a first threshold corresponding to the second link, the receiving status of the data frame corresponding to the first bit. Based on this possible implementation, each second link may be corresponding to one first threshold. This helps meet threshold requirements of different links. For example, as shown in FIG. 7, one or more link information fields may be added to a frame body (frame body) field in the ADDBA response frame, and each link information field is corresponding to one link. The first threshold may be located in a link information field of a corresponding link. For example, a link information field 1 is corresponding to the link 1, and a first threshold corresponding to the link 1 is located in the link information field 1. A link information field 2 is corresponding to the link 2, and a first threshold corresponding to the link 2 is located in the link information field 2. A link information field 3 is corresponding to the link 3, and a first threshold corresponding to the link 3 is located in the link information field 3. Optionally, the link information field may further include an identifier of a corresponding link. After the first multi-link device receives the BA frame, if the data frame corresponding to the first bit is a data frame sent over the link 1, the first multi-link device determines, based on the first time, the second time, and the first threshold corresponding to the link 1, the receiving status of the data frame corresponding to the first bit. If the data frame corresponding to the first bit is a data frame sent over the link 2, the first multi-link device determines, based on the first time, the second time, and the first threshold corresponding to the link 2, the receiving status of the data frame corresponding to the first bit. If the data frame corresponding to the first bit is a data frame sent over the link 3, the first multi-link device determines, based on the first time, the second time, and the first threshold corresponding to the link 3, the receiving status of the data frame corresponding to the first bit.

Manner 2: The first threshold may be pre-specified in a protocol. The protocol may stipulate that multiple links are corresponding to a same first threshold. Alternatively, different links may be corresponding to different first thresholds, and the protocol may specify a first threshold corresponding to each link. Optionally, the first threshold may be a multi-link inter frame space (multi-link inter frame space, MLIFS). The MLIFS may be a short inter-frame space (short inter-frame space, SIFS), a point coordination function inter frame space (PCF inter frame Space, PIFS), or a distributed inter-frame space (distributed inter-frame spacing, DIFS). The first threshold may be determined by an access point and broadcast by using a beacon frame (Beacon frame).

In a possible implementation, in the manner 2, before the first multi-link device sends the data frames to the second multi-link device over the multiple links, the first multi-link device may further receive indication information sent by the second multi-link device, where the indication information indicates whether a station on the first link in the second multi-link device can determine, within a time period of the first threshold after the second multi-link device receives the data frame over the second link, the receiving status of the data frame received over the second link. It can also be understood as: If the indication information indicates that after the second multi-link device receives the data frame over the second link, the station on the first link in the second multi-link device can determine, within the time period of the first threshold, the receiving status of the data frame received over the second link, it indicates that the second link supports the first threshold; otherwise, it indicates that the second link does not support the first threshold. Because the first threshold is a fixed value pre-specified in the protocol, the first threshold is not necessarily supported by the second link. When the second link supports the first threshold, the first multi-link device can accurately determine, based on the first threshold and the delay between the second time and the first time, receiving failure status of the data frame corresponding to the first bit. Otherwise, the first multi-link device cannot accurately determine, based on the first threshold and the delay between the second time and the first time, receiving failure status of the data frame corresponding to the first bit. Therefore, based on this possible implementation, the first multi-link device can learn in advance whether the second link supports the first threshold, to determine whether to determine, based on the first threshold and the delay between the second time and the first time, the receiving status of the data frame corresponding to the first bit.

In a possible implementation, the indication information may be located in an ADDBA response frame. Before sending the data frame to the second multi-link device over the multiple links, the first multi-link device may first send an ADDBA (add block acknowledgment) request frame to the second multi-link device. After receiving the ADDBA request frame, the second multi-link device sends an ADDBA response frame to the first multi-link device. The ADDBA response frame carries the indication information.

The following further describes, based on four manners in which the BA frame carries a receiving status of a data frame, a specific implementation in which if the delay between the second time and the first time is greater than or equal to the first threshold, the first multi-link device determines that the receiving status of the data frame corresponding to the first bit is receiving failure. For example, the data frame is an MPDU.

Manner 1: If an MPDU is carried in a PPDU, and a time interval between an end time of the PPDU and the transmission time of the BA frame exceeds an MLIFS, an acknowledgment status (or a receiving status) of the MPDU is carried in the BA frame (if an MPDU is carried in a PPDU, and the duration from the ending of the PPDU to the transmission time of the BA has exceeded MLIFS (multi-link inter frame space), then the ACK status of that MPDU is carried in the BA frame). The end time of the PPDU may be a sending end time of the PPDU or a receiving end time of the PPDU.

Correspondingly, if a time interval between an end time of a PPDU in which an MPDU corresponding to the first bit is located and the transmission time of the BA frame exceeds the MLIFS, the first multi-link device determines that the receiving status of the data frame corresponding to the first bit is receiving failure. That is, the delay between the first time and the second time is duration between the end time of the PPDU in which the MPDU corresponding to the first bit is located and the transmission time of the BA frame. The first threshold is the MLIFS. The MLIFS may be an SIFS, a PIFS, or a DIFS. For a manner of obtaining the first threshold, refer to the foregoing manner 2 of obtaining the first threshold.

Figure 19:
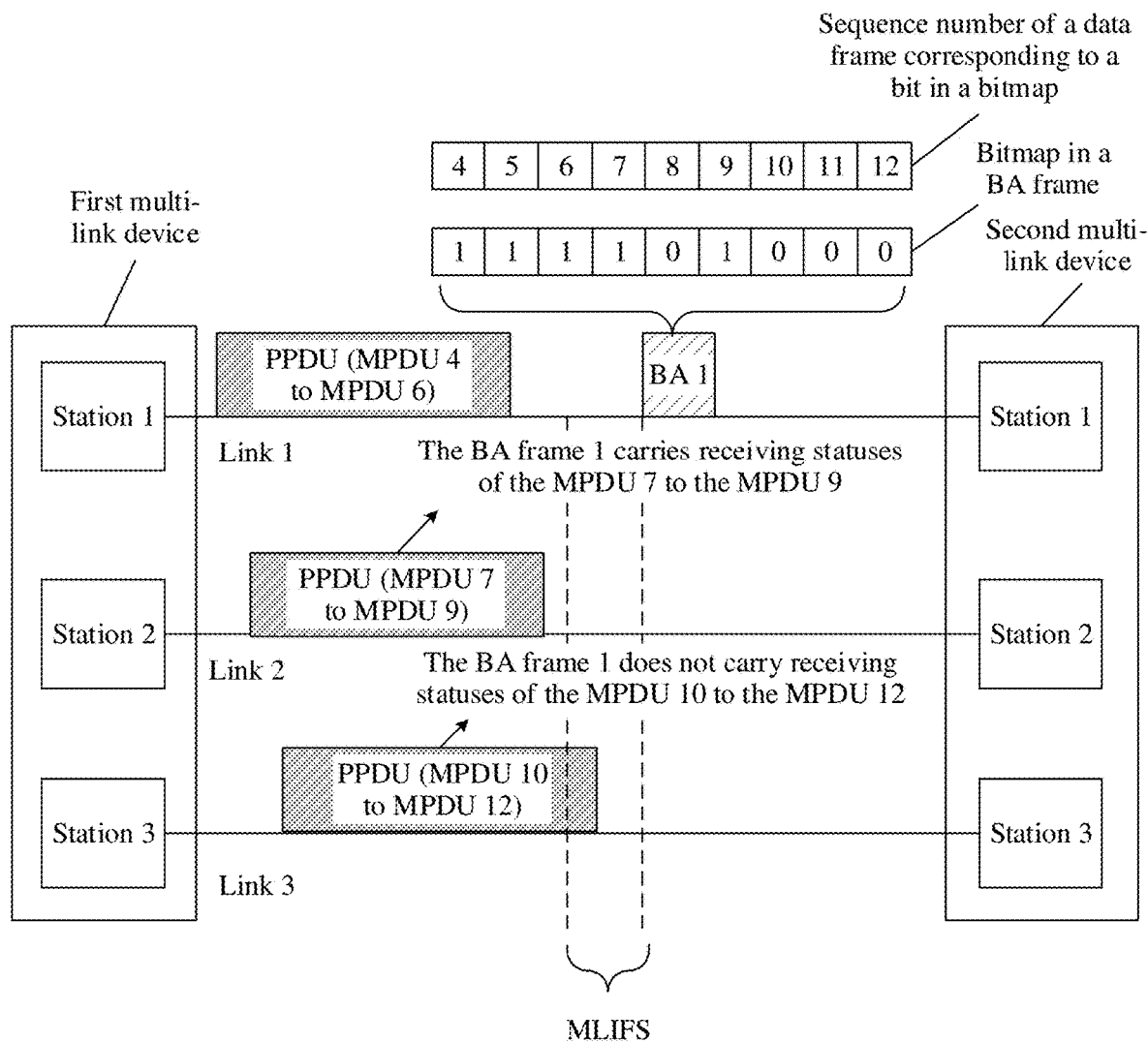
FIG. 19 is still another schematic diagram of transmission of a data frame and a BA frame according to an embodiment of this application.

For example, as shown in FIG. 19, a PPDU transmitted over the link 2 carries the MPDU 7 to the MPDU 9. A time interval between an end time of the PPDU transmitted over the link 2 and a transmission time of the BA frame 1 exceeds the MLIFS. Therefore, the BA frame 1 carries the receiving statuses of the MPDU 7 to the MPDU 9. If an MPDU is successfully received, a bit value corresponding to the MPDU in the BA frame 1 is 1. If an MPDU fails to be received, a bit value corresponding to the MPDU in the BA frame 1 is 0. After receiving the BA frame 1, the first multi-link device determines that an interval between the transmission time of the BA frame 1 and the end time of the PPDU in which the MPDU 8 with a bit value of 0 is located is greater than the MLIFS. Therefore, the first multi-link device determines that the BA frame 1 carries the receiving status of the MPDU 8. Because the bit value corresponding to the MPDU 8 is 0, the first multi-link device determines that the receiving status of the MPDU 8 is receiving failure.

A time interval between an end time of a PPDU transmitted over the link 3 and the transmission time of the BA frame 1 does not exceed the MLIFS. Therefore, the BA frame 1 does not carry the receiving statuses of the MPDU 10 to the MPDU 12. After receiving the BA frame 1, the first multi-link device determines that an interval between a receiving time of the BA frame 1 and the end time of the PPDU in which the MPDU 10 to the MPDU 12 with bit values of 0 are located is less than the MLIFS. Therefore, the first multi-link device determines that the BA frame 1 does not carry the receiving statuses of the MPDU 10 to the MPDU 12.

Manner 2: If an MPDU is carried in one or more OFDM symbols of a PPDU, and a time interval between an end time of a last OFDM symbol that carries the MPDU and the transmission time of the BA frame exceeds an MLIFS, an acknowledgment status (or a receiving status) of the MPDU is carried in the BA frame (if an MPDU is carried in one or more OFDM symbols of a PPDU, and the duration from the ending of the last OFDM symbol that carries the MPDU to the transmission time of the BA has exceeded MLIFS, then the ACK status of that MPDU is carried in the BA frame). The end time of the last OFDM symbol that carries the MPDU may also be understood as an end time of an OFDM symbol in which a last bit of the data frame is located. The end time of the OFDM symbol may be a sending end time of the OFDM symbol or a receiving end time of the OFDM symbol.

Correspondingly, if a time interval between an end time of a last OFDM symbol that carries an MPDU corresponding to the first bit and a transmission time of the BA frame exceeds the MLIFS, the first multi-link device determines that the receiving status of the data frame corresponding to the first bit is receiving failure. That is, the delay between the first time and the second time is duration between the end time of the last OFDM symbol that carries the MPDU corresponding to the first bit and the transmission time of the BA frame. The first threshold is the MLIFS. The MLIFS may be an SIFS, a PIFS, or a DIFS. For a manner of obtaining the first threshold, refer to the foregoing manner 2 of obtaining the first threshold.

Figure 20:
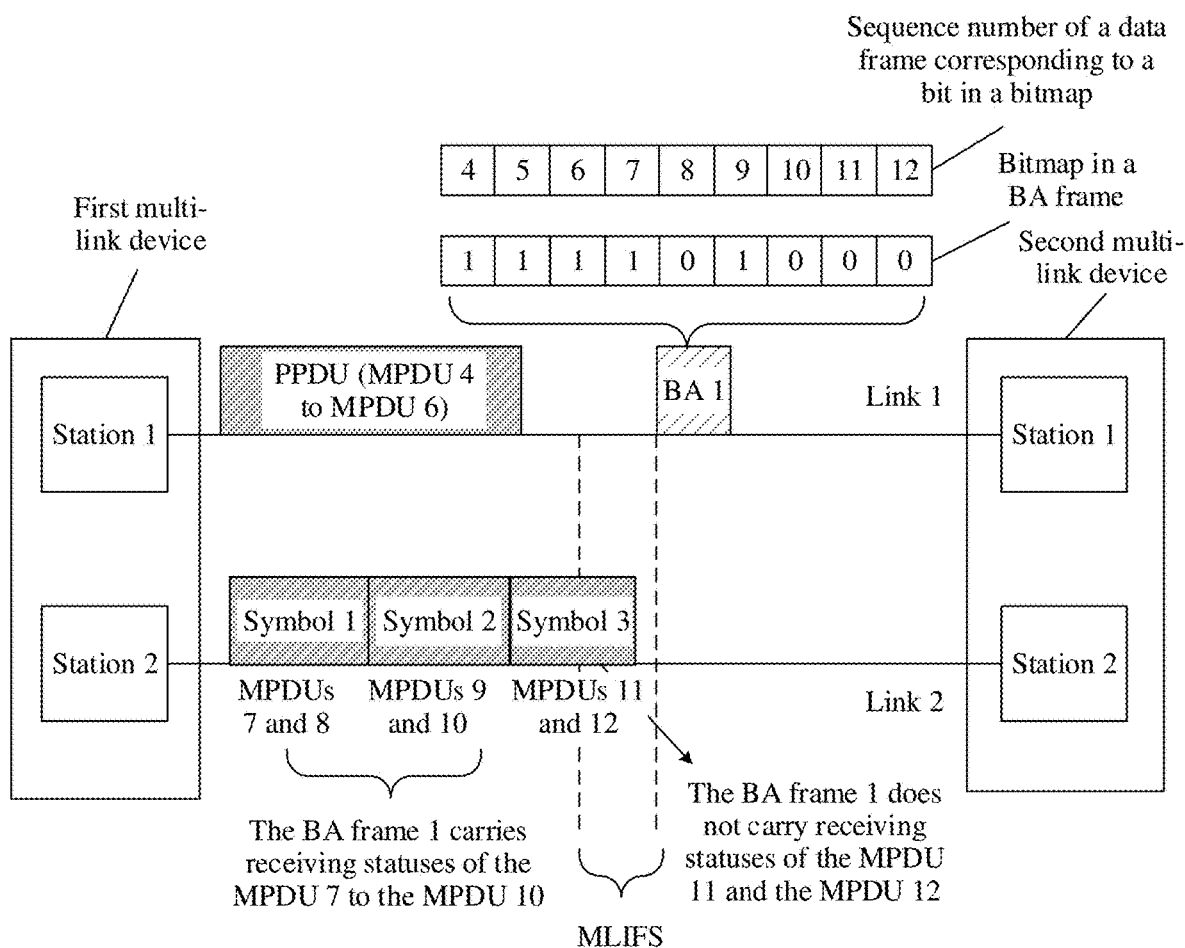
FIG. 20 is still another schematic diagram of transmission of a data frame and a BA frame according to an embodiment of this application.

For example, as shown in FIG. 20, a PPDU transmitted over the link 2 includes a symbol (Symbol) 1 to a symbol (Symbol) 3. The symbol 1 carries the MPDU 7 and the MPDU 8, the symbol 2 carries the MPDU 9 and the MPDU 10, and the symbol 3 carries the MPDU 11 and the MPDU 12. A time interval between an end time of the symbol 1 transmitted over the link 2 and a transmission time of the BA frame 1 exceeds the MLIFS. Therefore, the BA frame 1 carries the receiving statuses of the MPDU 7 and the MPDU 8. A time interval between an end time of the symbol 2 transmitted over the link 2 and the transmission time of the BA frame 1 exceeds the MLIFS. Therefore, the BA frame 1 carries the receiving statuses of the MPDU 9 and the MPDU 10. A time interval between an end time of the symbol 3 transmitted over the link 2 and the transmission time of the BA frame 1 does not exceed the MLIFS. Therefore, the BA frame 1 does not carry the receiving statuses of the MPDU 11 and the MPDU 12.

If an MPDU is successfully received, a bit value corresponding to the MPDU in the BA frame 1 is 1. If an MPDU fails to be received, a bit value corresponding to the MPDU in the BA frame 1 is 0. After receiving the BA frame 1, the first multi-link device determines that an interval between the end time of the symbol 1 in which the MPDU 8 with a bit value of 0 is located and a receiving time of the BA frame 1 is greater than the MLIFS. Therefore, the first multi-link device determines that the BA frame 1 carries the receiving status of the MPDU 8. The bit value corresponding to the MPDU 8 is 0. Therefore, the first multi-link device determines that the receiving status of the MPDU 8 is receiving failure. Similarly, the first multi-link device determines that an interval between the end time of the symbol 2 in which the MPDU 10 with a bit value of 0 is located and the receiving time of the BA frame 1 is greater than the MLIFS. Therefore, the first multi-link device determines that the receiving status of the MPDU 10 carried in the BA frame 1 is receiving failure. The first multi-link device determines that an interval between the end time of the symbol 3 in which the MPDU 11 and the MPDU 12 with bit values of 0 are located and the receiving time of the BA frame 1 is less than the MLIFS. Therefore, the first multi-link device determines that the BA frame 1 does not carry the receiving statuses of the MPDU 11 and the MPDU 12.

Manner 3: If an MPDU is carried in a PPDU, and a time interval between an end time of the PPDU and a transmission time of the BA frame exceeds a time threshold M, an acknowledgment status (or a receiving status) of the MPDU is carried in the BA frame (if an MPDU is carried in a PPDU, and the duration from the ending of the PPDU to the transmission time of the BA has exceeded a time threshold M, then the ACK status of that MPDU is carried in the BA frame). The end time of the PPDU may be a sending end time of the PPDU or a receiving end time of the OFDM symbol.

Figure 21:
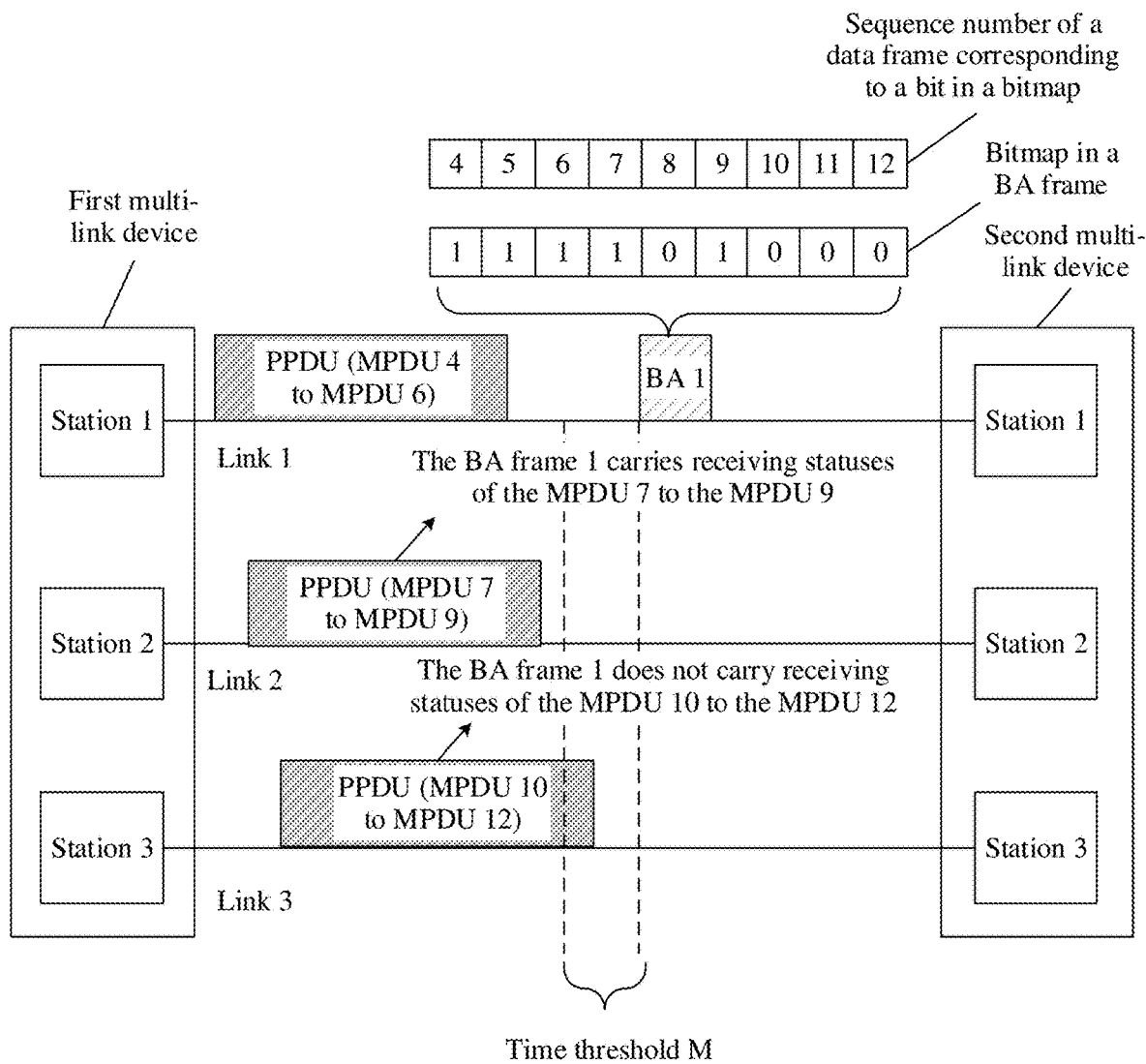
FIG. 21 is still another schematic diagram of transmission of a data frame and a BA frame according to an embodiment of this application.

Correspondingly, if a time interval between an end time of a PPDU in which an MPDU corresponding to the first bit is located and the transmission time of the BA frame exceeds the time threshold M, the first multi-link device determines that the receiving status of the data frame corresponding to the first bit is receiving failure. That is, the delay between the first time and the second time is duration between the end time of the PPDU in which the MPDU corresponding to the first bit is located and the transmission time of the BA frame. The first threshold is the time threshold M. For a manner of obtaining the first threshold, refer to the foregoing manner 1 of obtaining the first threshold. For example, as shown in FIG. 21, a specific implementation principle of FIG. 21 is the same as that of FIG. 19, and the MLIFS in FIG. 19 is replaced with the time threshold M. Details are not described herein again.

Manner 4: If an MPDU is carried in one or more OFDM symbols of a PPDU, and a time interval between an end time of a last OFDM symbol that carries the MPDU and a transmission time of the BA frame exceeds a time threshold M, an acknowledgment status (or a receiving status) of the MPDU is carried in the BA frame (if an MPDU is carried in one or more OFDM symbols of a PPDU, and the duration from the ending of the last OFDM symbol that carries the MPDU to the transmission time of the BA has exceeded a time threshold M, then the ACK status of that MPDU is carried in the BA frame). The acknowledgment status of the MPDU is a receiving status of the MPDU. The end time of the last OFDM symbol that carries the MPDU may also be understood as an end time of an OFDM symbol in which a last bit of the data frame is located. The end time of the OFDM symbol may be a sending end time of the OFDM symbol or a receiving end time of the OFDM symbol.

Figure 22:
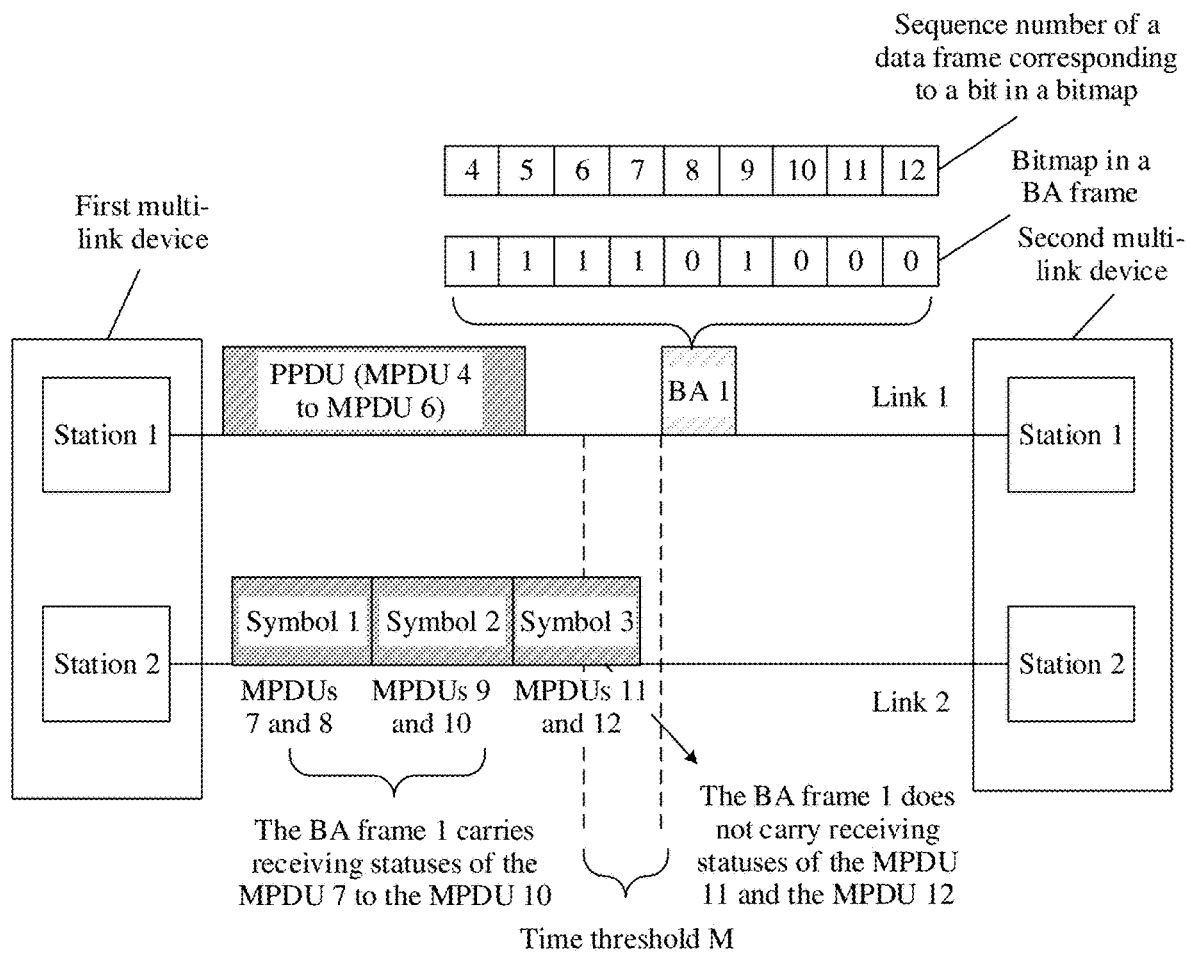
FIG. 22 is still another schematic diagram of transmission of a data frame and a BA frame according to an embodiment of this application.

Correspondingly, if a time interval between an end time of a last OFDM symbol that carries an MPDU corresponding to the first bit and a transmission time of the BA frame exceeds the time threshold M, the first multi-link device determines that the receiving status of the data frame corresponding to the first bit is receiving failure. That is, the delay between the first time and the second time is duration between the end time of the last OFDM symbol that carries the MPDU corresponding to the first bit and the transmission time of the BA frame. The first threshold is the time threshold M. For a manner of obtaining the first threshold, refer to the foregoing manner 1 of obtaining the first threshold. For example, as shown in FIG. 22, a specific implementation principle of FIG. 22 is the same as that of FIG. 20, and the MLIFS in FIG. 20 is replaced with the time threshold M. Details are not described herein again.

Optionally, the transmission time of the BA frame in the four manners in which the BA frame carries the receiving status of the data frame may be replaced with the receiving time of the BA frame. A specific implementation principle after replacement is the same, and details are not described herein again.

In a possible implementation, the second multi-link device may send, to the first multi-link device, information about a capability of the second multi-link device to transmit a multi-link BA frame. The capability information may include one or more capability levels. The multi-link BA frame indicates that the BA frame includes receiving statuses of data frames transmitted over multiple links. Optionally, the capability information may be carried in an ADDBA (add block acknowledgment) response frame or an EHT capabilities information element of an association request (association request)/re-association request (re-association request)/authentication (authentication)/probe request (probe request) frame, to be sent to the first multi-link device. Based on this possible implementation, the first multi-link device can learn of the capability of the second multi-link device to transmit the multi-link BA frame. In this way, the first multi-link device parses, in a correct parsing manner, a receiving status of a data frame indicated by the bitmap in the BA frame.

In a possible implementation, the capability information may include one or more of the following three capability levels. An example in which the data frame is an MPDU is used.

Capability level 1: The second multi-link device does not support transmission of a multi-link BA frame. At this level, a BA frame carries only a receiving status of an MPDU sent over a same link, and does not carry a receiving status of an MPDU sent over another link.

Capability level 2: The second multi-link device supports transmission of a PPDU-based multi-link BA frame.

At this level, the BA frame carries a receiving status of an MPDU sent over a same link. In addition, the BA frame further carries a receiving status of an MPDU sent over another link that meets the following condition: A time interval between an end time of a PPDU in which the MPDU is located and a transmission time of the BA frame is greater than a first threshold. For example, at this level, the BA frame carries a receiving status of an MPDU sent over the first link. In addition, the BA frame further carries a receiving status of an MPDU sent over the second link that meets the following condition: A time interval between an end time of a PPDU in which the MPDU is located and a transmission time of the BA frame is greater than the first threshold.

For example, the first threshold is an MLFS. At the capability level 2, as shown in FIG. 19, the BA frame 1 sent by the second multi-link device carries the receiving statuses of the MPDU 4 to the MPDU 6 sent over the link 1. In addition, because a time interval between an end time of a PPDU in which the MPDU 7 to the MPDU 9 sent over the link 2 are located and the transmission time of the BA frame is greater than the MLFS, the BA frame 1 further carries the receiving statuses of the MPDU 7 to the MPDU 9 sent over the link 2.

For another example, the first threshold is a time threshold M. At the capability level 2, as shown in FIG. 21, the BA frame 1 sent by the second multi-link device carries the receiving statuses of the MPDU 4 to the MPDU 6 sent over the link 1. At addition, because a time interval between an end time of a PPDU in which the MPDU 7 to the MPDU 9 sent over the link 2 are located and the transmission time of the BA frame is greater than the time threshold M, the BA frame 1 further carries the receiving statuses of the MPDU 7 to the MPDU 9 sent over the link 2.

Capability level 3: The second multi-link device supports transmission of an MPDU-based multi-link BA frame.

At this level, the BA frame carries a receiving status of an MPDU sent over a same link. In addition, the BA frame further carries a receiving status of an MPDU sent over another link that meets the following condition: A time interval between an end time of a last OFDM symbol in one or more OFDM symbols in which the MPDU is located and a transmission time of the BA frame is greater than the first threshold. At this level, the BA frame carries a receiving status of an MPDU sent over the first link. In addition, the BA frame further carries a receiving status of an MPDU sent over the second link that meets the following condition: A time interval between an end time of a last OFDM symbol in one or more OFDM symbols in which the MPDU is located and a transmission time of the BA frame is greater than the first threshold.

For example, the first threshold is an MLFS. At the capability level 3, as shown in FIG. 20, the BA frame 1 sent by the second multi-link device carries the receiving statuses of the MPDU 4 to the MPDU 6 sent over the link 1. In addition, a time interval between an end time of a last OFDM symbol in one or more OFDM symbols in which the MPDU 7 to the MPDU 10 sent over the link 2 are located and the transmission time of the BA frame is greater than the MLFS, the BA frame 1 further carries the receiving statuses of the MPDU 7 to the MPDU 10 sent over the link 2.

For another example, the first threshold is a time threshold M. At the capability level 3, as shown in FIG. 22, the BA frame 1 sent by the second multi-link device carries the receiving statuses of the MPDU 4 to the MPDU 6 sent over the link 1. In addition, a time interval between an end time of a last OFDM symbol in one or more OFDM symbols in which the MPDU 7 to the MPDU 10 sent over the link 2 are located and the transmission time of the BA frame is greater than the time threshold M, the BA frame 1 further carries the receiving statuses of the MPDU 7 to the MPDU 10 sent over the link 2.

Optionally, the transmission time of the BA frame at the capability level 2 and the capability level 3 may alternatively be replaced with a receiving time of the BA frame.

In a possible implementation, if the delay between the second time and the first time is less than a second threshold, the first multi-link device determines that the station corresponding to the first link in the second multi-link device does not obtain the receiving status of the data frame corresponding to the first bit, where the second threshold is less than the first threshold. If the delay between the second time and the first time is less than the second threshold, it indicates that before the second multi-link device generates the BA frame, the station on the second link in the second multi-link device does not have sufficient time to transfer the receiving status of the data frame corresponding to the first bit to the station on the first link in the second multi-link device. Therefore, if the delay between the second time and the first time is less than the second threshold, the first multi-link device determines that the station corresponding to the first link in the second multi-link device does not obtain the receiving status of the data frame corresponding to the first bit. It can be learned that, based on this possible implementation, it can be accurately determined that the station corresponding to the first link in the second multi-link device does not obtain the receiving status of the data frame corresponding to the first bit.

In a possible implementation, if the delay between the second time and the first time is greater than a second threshold, and the delay between the second time and the first time is less than the first threshold, the first multi-link device sends a block acknowledgment request BAR frame or a data frame to the second multi-link device before retransmitting the data frame corresponding to the first bit. If the delay between the second time and the first time is greater than the second threshold, and the delay between the second time and the first time is less than the first threshold, it indicates that the receiving status of the data frame corresponding to the first bit cannot be determined. In other words, the first bit has ambiguity. Based on this possible implementation, before the first multi-link device retransmits the data frame corresponding to the first bit, the ambiguity of the first bit can be first eliminated. The data frame corresponding to the first bit is retransmitted when it is clearly determined that the data frame corresponding to the first bit fails to be received. This helps avoid a waste of transmission resources caused by retransmission of a successfully received data frame.

It can be learned that, based on the method described in FIG. 4, accuracy of determining a receiving status of a data frame is improved.

Figure 8:
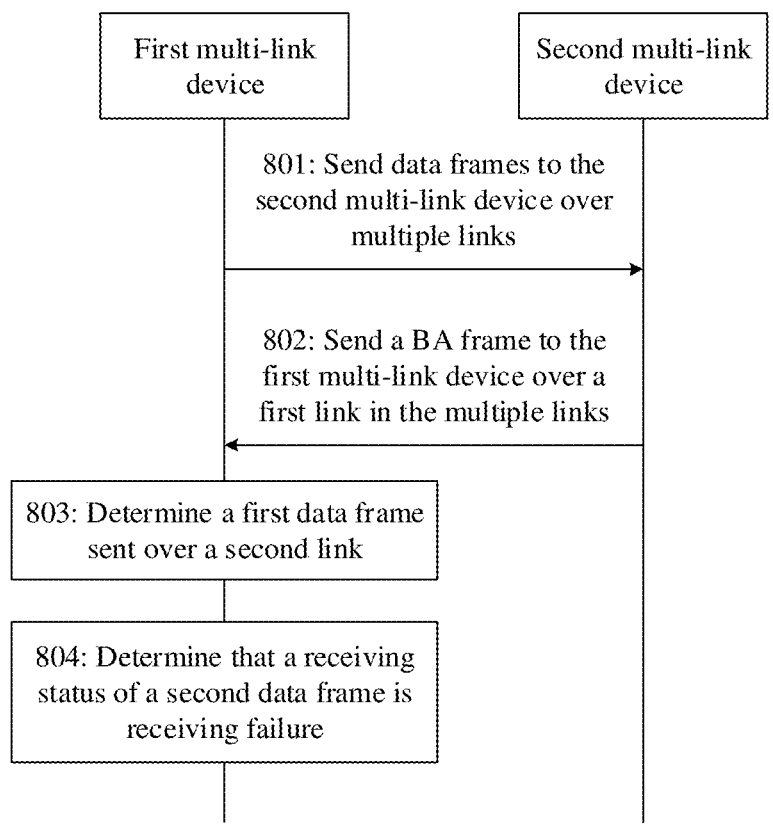
FIG. 8 is another schematic flowchart of determining a receiving status of a data frame according to an embodiment of this application.

FIG. 8 is a schematic flowchart of a method for determining a receiving status of a data frame according to an embodiment of this application. As shown in FIG. 8, the method for determining a receiving status of a data frame includes the following step 801 to step 804. The method shown in FIG. 8 may be performed by a first multi-link device and a second multi-link device. Alternatively, the method shown in FIG. 8 may be executed by a chip in the first multi-link device and a chip in the second multi-link device. FIG. 8 is described by using an example in which the first multi-link device and the second multi-link device are used as execution bodies.

801: The first multi-link device sends data frames to the second multi-link device over multiple links.

802: The second multi-link device sends a block acknowledgment (block ACK, BA) frame to the first multi-link device over a first link in the multiple links. The BA frame carries a bitmap, and the bitmap indicates a receiving status of a data frame transmitted over the first link and a receiving status of a data frame transmitted over a second link in the multiple links.

In a possible implementation, the BA frame includes a start sequence number of a data frame whose receiving status is fed back, the start sequence number is less than or equal to a first sequence number, and the first sequence number is a smallest value of sequence numbers of data frames that are not acknowledged to be received.

For specific implementations of step 801 and step 802, refer to the specific implementations of step 401 and step 402. Details are not described herein.

803: The first multi-link device determines a first data frame sent over the second link.

After receiving the BA frame, the first multi-link device determines the first data frame sent over the second link. The first data frame is a data frame whose transmission time is the last in a data frame set, and the data frame set includes a data frame that is sent over the second link and that has been correctly received. A bit value corresponding to the data frame that is sent over the second link and that has been correctly received is a second value.

804: The first multi-link device determines that a receiving status of a second data frame is receiving failure.

In this embodiment of this application, after determining the receiving state of the first data frame sent over the second link, the first multi-link device determines that the receiving status of the second data frame is receiving failure. The second data frame is a data frame sent over the second link before the first data frame, and a bit value corresponding to the second data frame in the bitmap is a first value. The first value is different from the second value. The second value indicates that the data frame is successfully received. For example, the first value is 0, and the second value is 1. Alternatively, the first value is 1, and the second value is 0.

Figures 23, 24:
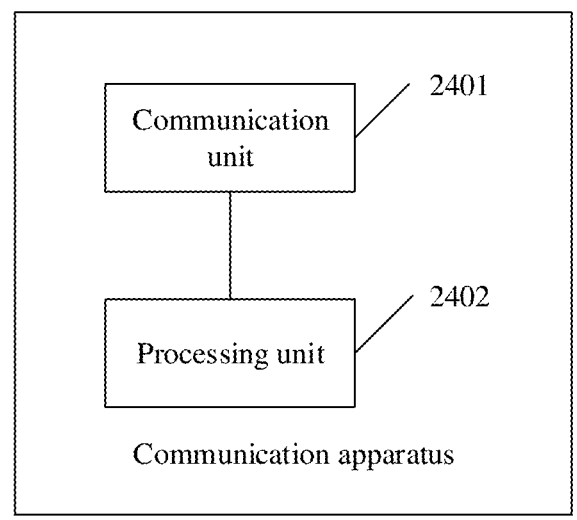
FIG. 23 is a schematic diagram of a structure of still another ADDBA response frame according to an embodiment of this application.
FIG. 24 is a schematic diagram of a structure of a communication apparatus according to an embodiment of this application.

In a possible implementation, before performing step 801 to step 804, the second multi-link device may send indication information to the first multi-link device. A first value of the indication information indicates the receiving status that is of the data frame transmitted over the second link and that is carried in the BA frame sent by the second multi-link device in step 802. Optionally, the indication information may be carried in an ADDBA (add block acknowledgment) response frame or an EHT capabilities information element of an association request (association request)/re-association request (re-association request)/authentication (authentication)/probe request (probe request) frame, to be sent to the first multi-link device. Optionally, the indication information may be 1-bit information, and is carried in a $6^{th}$ bit (B5) in a block acknowledgment parameter set (block ack parameter set) field in an ADDBA (add block acknowledgment) response frame, for example, as shown in FIG. 23.

In a possible implementation, before retransmitting a third data frame, a block acknowledgment request BAR frame or a data frame is sent to the second multi-link device, where a bit value corresponding to the third data frame in the bitmap is the first value, and the third data frame is a data frame sent over the second link after the first data frame.

For example, the first value is 0, and the second value is 1. As shown in FIG. 5, an example in which the BA frame is a BA frame 1 is used. If a bit value in a bitmap of the BA frame 1 is 1, an MPDU is successfully received. There are two second links, a link 2 and a link 3. A $4^{th}$ bit to a $6^{th}$ bit are corresponding to an MPDU 7 to an MPDU 9 transmitted over the link 2. A $7^{th}$ bit to a $9^{th}$ bit are corresponding to an MPDU 10 to an MPDU 12 transmitted over the link 3.

For the link 2, the first multi-link device determines, from the MPDU 7 to the MPDU 9, that MPDUs that have been successfully received are the MPDU 7 and the MPDU 9. The MPDU 9 is a successfully received MPDU that is sent last in the MPDU 7 and the MPDU 9. Therefore, the MPDU 9 is the first data frame. Because the MPDU 8 is sent before a first data frame, and a bit value corresponding to the MPDU 8 is 0, the MPDU 8 is the second data frame. The first multi-link device determines that a receiving status of the MPDU 8 is receiving failure.

For the link 3, the first multi-link device determines, from the MPDU 10 to the MPDU 12, that an MPDU that has been successfully received is the MPDU 11. Therefore, the MPDU 11 is the first data frame. Because the MPDU 10 is sent before the first data frame, and a bit value corresponding to the MPDU 10 is 0, the MPDU 10 is the second data frame. The first multi-link device determines that a receiving status of the MPDU 10 is receiving failure. A bit value corresponding to the MPDU 12 is 0, and the MPDU 12 is sent after the MPDU 11. Therefore, the MPDU 12 is a third data frame. The first multi-link device temporarily cannot determine a receiving status of the MPDU 12. Therefore, ambiguity of the bit corresponding to the MPDU 12 needs to be eliminated first, and then whether to retransmit the MPDU 12 is determined. A method for eliminating the ambiguity of the bit corresponding to the MPDU 12 may be: sending a block acknowledgment request BAR frame to the second multi-link device or continuing to send a subsequent MPDU.

In a possible implementation, the first data frame is a data frame whose transmission time is the last in a data frame set, and the data frame set includes correctly received data frames sent over multiple second links. Optionally, a time interval between a time t4 and a time t5 corresponding to each link is the same or similar. The time t4 is a time at which a station on the second link in the second multi-link device receives a data frame corresponding to a first bit. The time t5 is a time at which the station on the second link in the second multi-link device successfully transfers a receiving status of the data frame corresponding to the first bit to a station on the first link in the second multi-link device. Based on this possible implementation, the first data frame can be determined from the data frames sent over the multiple second links, and there is no need to determine one first data frame for each second link. This helps reduce computing resources.

For example, as shown in FIG. 5, an example in which the BA frame is a BA frame 1 is used. If a bit value in a bitmap of the BA frame 1 is 1, an MPDU is successfully received. There are two second links, a link 2 and a link 3. A $4^{th}$ bit to a $6^{th}$ bit are corresponding to an MPDU 7 to an MPDU 9 transmitted over the link 2. A $7^{th}$ bit to a $9^{th}$ bit are corresponding to an MPDU 10 to an MPDU 12 transmitted over the link 3. Because a successfully received MPDU that is sent last over the link 2 and the link 3 is the MPDU 11, the MPDU 11 is the first data frame. The MPDU 8 and the MPDU 10 are second data frames. The MPDU 12 is the third data frame. Therefore, the first multi-link device determines that the receiving statuses of the MPDU 8 and the MPDU 10 are receiving failure.

It can be learned that, based on the method described in FIG. 8, accuracy of determining a receiving status of a data frame is improved. This avoids that the first multi-link device determines a receiving status of a data frame that has been successfully received by the second multi-link device as receiving failure, and unnecessarily retransmits the data frame.

Figure 9:
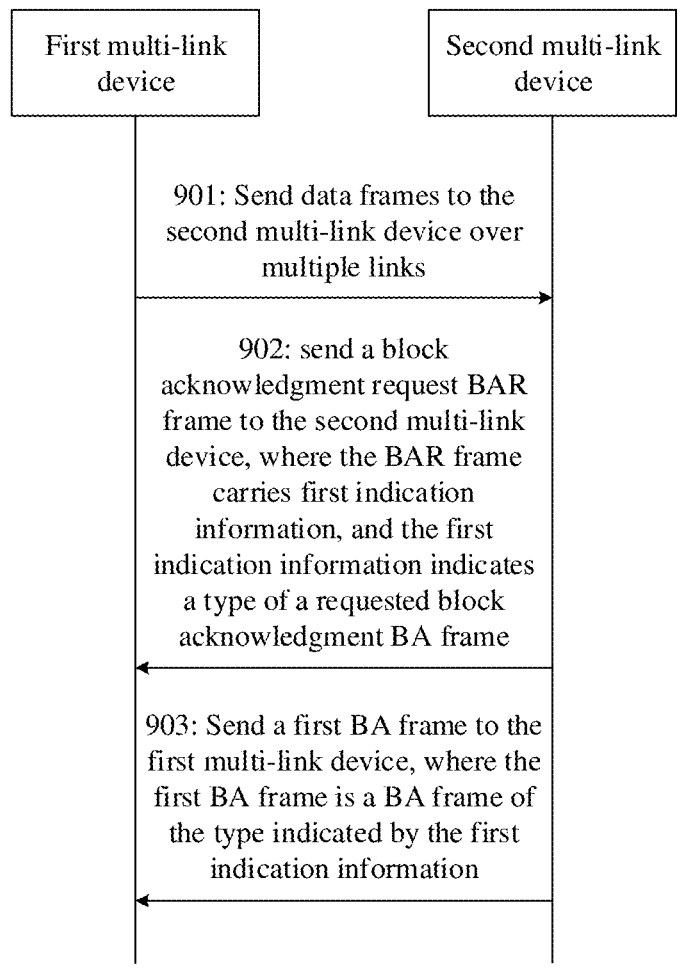
FIG. 9 is still another schematic flowchart of transmission of a BA frame according to an embodiment of this application.

FIG. 9 is a schematic flowchart of a block acknowledgment frame transmission method according to an embodiment of this application. As shown in FIG. 9, the block acknowledgment frame transmission method includes the following step 901 to step 903. The method shown in FIG. 9 may be performed by a first multi-link device and a second multi-link device. Alternatively, the method shown in FIG. 9 may be executed by a chip in the first multi-link device and a chip in the second multi-link device. FIG. 9 is described by using an example in which the first multi-link device and the second multi-link device are used as execution bodies.

901: The first multi-link device sends data frames to the second multi-link device over multiple links.

For a specific implementation of step 901, refer to the specific implementation of step 401. Details are not described herein.

902: The first multi-link device sends a block acknowledgment request BAR frame to the second multi-link device.

In this embodiment of this application, after sending the data frames to the second multi-link device over the multiple links, the first multi-link device sends the block acknowledgment request BAR frame to the second multi-link device. The BAR frame carries first indication information, and the first indication information indicates a type of a requested block acknowledgment BA frame.

The type of the BA frame may be a single-link BA frame type or a multi-link BA frame type. The single-link BA frame type indicates that a BA frame includes only a receiving status of a data frame transmitted over one link. The multi-link BA frame type indicates that a BA frame includes only receiving statuses of data frames transmitted over multiple links.

Figure 10:
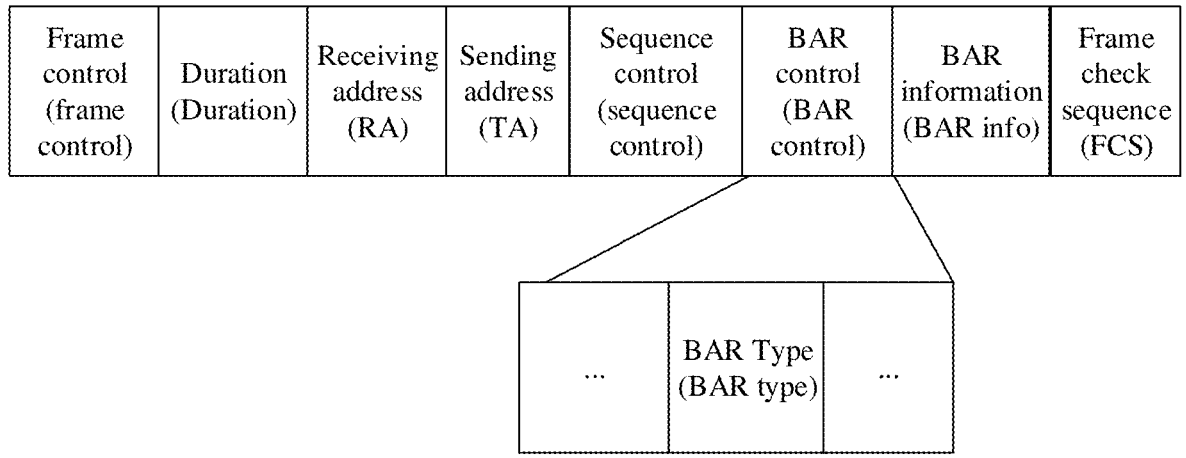
FIG. 10 is a schematic diagram of a structure of a BAR frame according to an embodiment of this application.

In a possible implementation, the first indication information is located in a BAR type field in the BAR frame. For example, the BAR type field in the BAR frame may be shown in FIG. 10. Based on this possible implementation, the first indication information can be carried by using an existing field. This helps reduce bits of the BAR frame.

In a possible implementation, when the first indication information indicates that the type of the requested BA frame is a multi-link BA frame, a value of the first indication information may be a reserved value of a BAR type field in an existing standard. For example, the value of the first indication information may be any one of 4, 5, or 11 to 15.

For example, as shown in the following table 1, when a value of the BAR type field is 4, it indicates that the type of the requested BA frame is the multi-link BA frame. When the value of the BAR type is 0, it indicates that the BAR type is a basic type. When the value of the BAR type is 1, it indicates that the BAR type is an extended compressed type. When the value of the BAR type is 2, the BAR type is a compressed type. When the value of the BAR type is 3, it indicates that the BAR type is a multi-service type. A value of 5 of the BAR type is a reserved value. When the value of the BAR type is 6, it indicates that the BAR type is a groupcast with retries type. Values of 7 to 9 of the BAR type are reserved values. When the value of the BAR type is 10, it indicates that the BAR type is a general link groupcast with retries type. Values of n to 15 of the BAR type are reserved values.

TABLE 1

| BAR type (BAR Type) field | BAR frame variant (BlockAckReq frame variant) |
| --- | --- |
| 0 | Basic (Basic) |
| 1 | Extended compressed (Extended Compressed) |
| 2 | Compressed (Compressed) |
| 3 | Multi-service type (Multi-TID) |
| 4 | Multi-link (Multi-link) |
| 5 | Reserved (Reserved) |
| 6 | Groupcast with retries (groupcast with retries, GCR) |
| 7 to 9 | Reserved (Reserved) |
| 10 | General link groupcast with retries (general link groupcast with retries, GLK-GCR) |
| 11 to 15 | Reserved (Reserved) |

For another example, as shown in the following table 2, when a value of the BAR type field is any one of 11 to 14, it indicates that the type of the requested BA frame is a multi-link BA frame. When the value of the BAR type is 11, it indicates that the BAR type is a basic type, and a BAR is used for requesting a multi-link BA frame. When the value of the BAR type is 12, it indicates that the BAR type is an extended compressed type, and the BAR is used for requesting a multi-link BA frame. When the value of the BAR type is 13, it indicates that the BAR type is a compressed type, and the RAR is used for requesting a multi-link BA frame. When the value of the BAR type is 14, it indicates that the BAR type is a multi-service type, and the BAR is used for requesting a multi-link BA frame.

TABLE 2

| BAR type (BAR Type) field | BAR frame variant (BlockAckReq frame variant) |
| --- | --- |
| 0 | Basic (Basic) |
| 1 | Extended compressed (Extended Compressed) |
| 2 | Compressed (Compressed) |
| 3 | Multi-service type (Multi-TID) |
| 4 and 5 | Reserved (Reserved) |
| 6 | Groupcast with retries (groupcast with retries, GCR) |
| 7 to 9 | Reserved (Reserved) |
| 10 | General link groupcast with retries (general link groupcast with retries, GLK-GCR) |
| 11 | Multi-link basic (Multi-link Basic) |
| 12 | Multi-link extended compressed (Multi-link Extended |
| 13 | Multi-link compressed (Multi-link Compressed) |
| 14 | Multi-link multi-service type (Multi-link Multi-TID) |
| 15 | Reserved (Reserved) |

Figure 11:
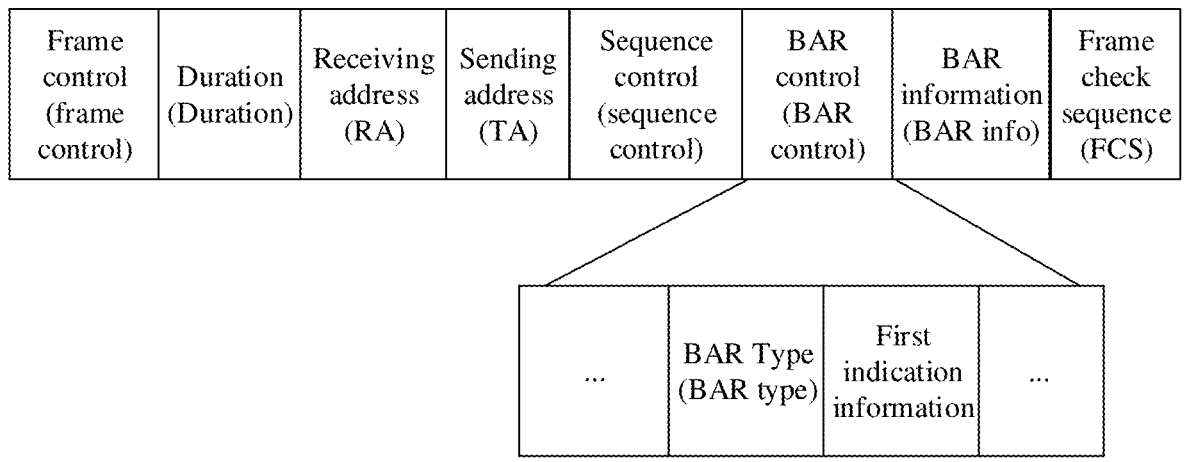
FIG. 11 is a schematic diagram of a structure of another BAR frame according to an embodiment of this application.

In a possible implementation, a new field may be added to the BAR frame, and the first indication information may alternatively be located in the new field in the BAR frame. For example, as shown in FIG. 11, a field may be added to a BAR control field in the BAR frame to carry the first indication information.

Figure 12:
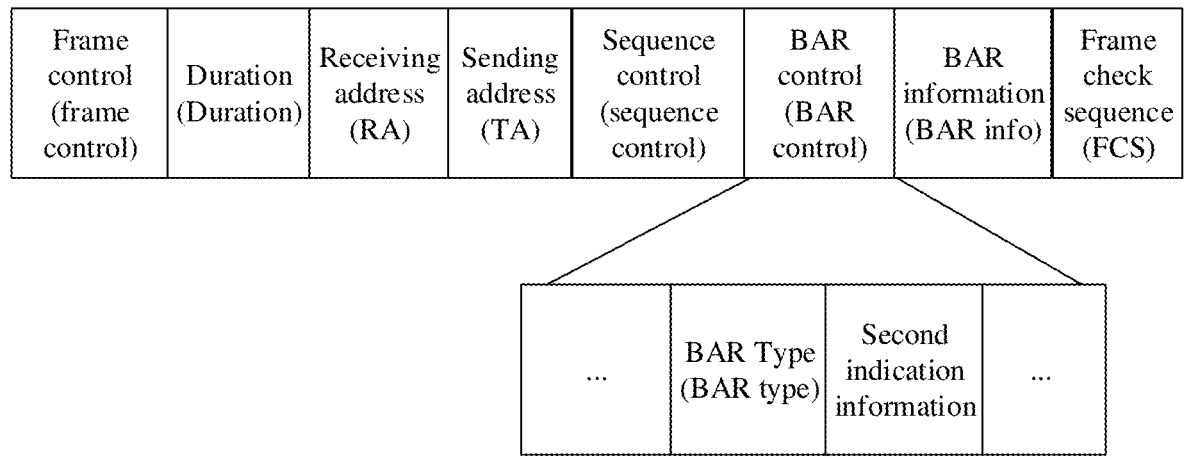
FIG. 12 is a schematic diagram of a structure of still another BAR frame according to an embodiment of this application.

In a possible implementation, the BAR frame further includes second indication information, the second indication information indicates one or more links in the multiple links, and the first BA frame indicates a receiving status of a data frame sent over the one or more links. Optionally, as shown in FIG. 12, the second indication information is located in a BAR control field in the BAR frame. The second indication information may be specifically a link bitmap. Based on this possible implementation, the first multi-link device can indicate, to the second multi-link device, that the second multi-link device needs to feed back receiving statuses of data frames sent over which links.

In a possible implementation, the first indication information indicates that the type of the requested BA frame is a multi-link BA frame, and an interval between a transmission end time of the data frames and a transmission start time of the BAR frame is greater than or equal to a preset time interval. The multi-link BA frame indicates that one BA frame includes receiving statuses of data frames sent over multiple links. In this case, if an interval between a transmission end time of a data frame and a transmission start time of the BAR frame is greater than or equal to a preset time interval, a station that feeds back the BA frame in the second multi-link device has sufficient time to receive a receiving status of a data frame transmitted over another link. This avoids a case in which a bit corresponding to the data frame is set to 0 because the second multi-link device does not receive the receiving status of the data frame transmitted over the another link, and avoids ambiguity of the bit corresponding to the data frame. This helps the first multi-link device improve accuracy of determining a receiving status of a data frame, to avoid that the first multi-link device determines a receiving status of a data frame that has been successfully received by the second multi-link device as receiving failure, and unnecessarily retransmits the data frame.

In a possible implementation, the second multi-link device includes multiple scoreboards, each link is corresponding to one scoreboard, and the scoreboard is used for recording a receiving status of a data frame transmitted over a corresponding link. In this way, the second multi-link device can distinguish between receiving statuses of data frames transmitted over different links, to feed back different types of BA frames.

Figure 13:
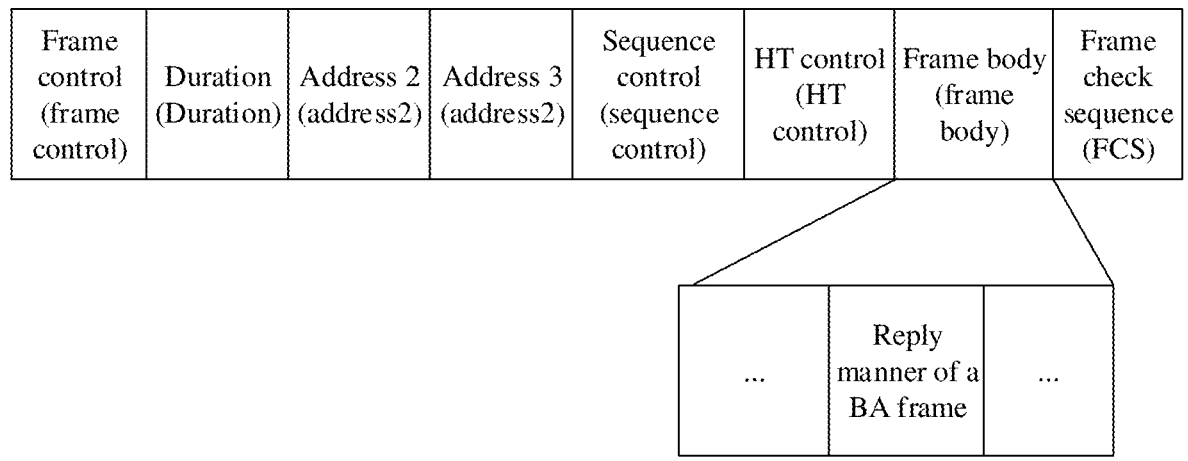
FIG. 13 is a schematic diagram of a structure of still another ADDBA response frame according to an embodiment of this application.

In a possible implementation, before the first multi-link device sends the data frames to the second multi-link device over the multiple links, the first multi-link device may further receive a reply manner of a BA frame sent by the second multi-link device, where the reply manner of the BA frame is delayed reply or immediate reply. For example, as shown in FIG. 13, the reply manner of the BA frame may be carried in a frame body field in an ADDBA response frame. Optionally, the reply manner of the BA frame may be carried in a block acknowledgment parameter set (Block Ack Parameter Set) of the frame body field in the ADDBA response frame. Based on this possible implementation, the first multi-link device can determine the reply manner of the BA frame sent by the second multi-link device.

903: The second multi-link device sends a first BA frame to the first multi-link device, where the first BA frame is a BA frame of the type indicated by the first indication information.

In a possible implementation, a time interval between a transmission end time of the BAR frame and a transmission start time of the first BA frame is greater than or equal to a preset threshold. Based on this possible implementation, the second multi-link device has sufficient time to generate the BA frame.

In a possible implementation, there is a padding bit behind the BAR frame, and the padding bit enables the time interval between the transmission end time of the BAR frame and the transmission start time of the first BA frame to be greater than or equal to the preset threshold. Based on this possible implementation, the time interval between the transmission end time of the BAR frame and the transmission start time of the first BA frame can be greater than the preset threshold.

It can be learned that, based on the method described in FIG. 9, the first multi-link device can flexibly obtain different types of BA frames based on different requirements. The block acknowledgment frame transmission method described in FIG. 9 may be implemented independently. Alternatively, the block acknowledgment frame transmission method described in FIG. 9 may be combined with the embodiment corresponding to the foregoing method for determining a receiving status of a data frame. For example, in the method for determining a receiving status of a data frame in FIG. 4 or FIG. 8, after the first multi-link device sends the data frames to the second multi-link device over the multiple links, and before the first multi-link device receives, over the first link in the multiple links, the block acknowledgment BA frame sent by the second multi-link device, the first multi-link device sends a block acknowledgment request BAR frame to the second multi-link device. The BAR frame carries first indication information, and the first indication information indicates that a type of a requested block acknowledgment BA frame is a multi-link BA frame. Optionally, the first indication information is located in the BAR type field in the BAR frame. Optionally, a value of the first indication information may be a reserved value of a BAR type field in an existing standard. Optionally, a new field may be added to the BAR frame, and the first indication information may alternatively be located in the new field in the BAR frame. Optionally, the BAR frame further includes second indication information, the second indication information indicates one or more second links in the multiple links, and the BA frame indicates a receiving status of a data frame sent over the one or more second links. Optionally, before the first multi-link device sends the data frames to the second multi-link device over the multiple links, the first multi-link device may further receive a reply manner of the BA frame sent by the second multi-link device, where the reply manner of the BA frame is delayed reply or immediate reply. Optionally, a time interval between a transmission end time of the BAR frame and a transmission start time of the BA frame is greater than a preset threshold. Optionally, there is a padding bit behind the BAR frame, and the padding bit enables the time interval between the transmission end time of the BAR frame and the transmission start time of the BA frame to be greater than the preset threshold.

Figure 14:
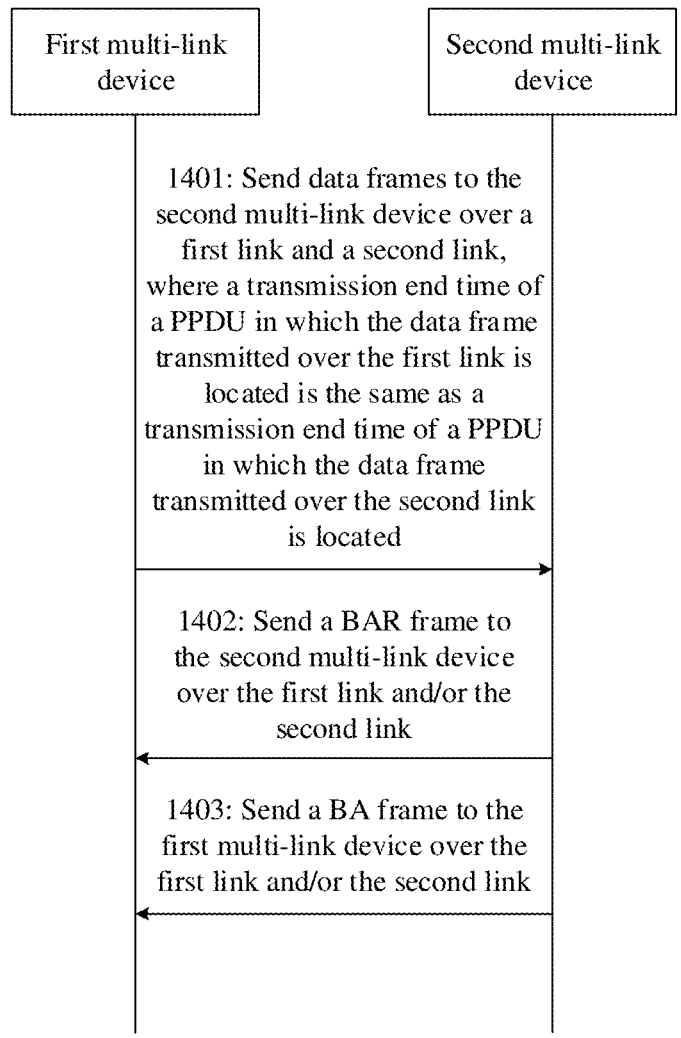
FIG. 14 is a schematic flowchart of transmission of a data frame according to an embodiment of this application.

FIG. 14 is a schematic flowchart of a data frame transmission method according to an embodiment of this application. As shown in FIG. 14, the data frame transmission method includes the following step 1401 to step 1403. The method shown in FIG. 14 may be performed by a first multi-link device and a second multi-link device. Alternatively, the method shown in FIG. 14 may be executed by a chip in the first multi-link device and a chip in the second multi-link device. FIG. 14 is described by using an example in which the first multi-link device and the second multi-link device are used as execution bodies.

1401: The first multi-link device sends data frames to the second multi-link device over a first link and a second link, where a transmission end time of a PPDU in which the data frame transmitted over the first link is located is the same as a transmission end time of a PPDU in which the data frame transmitted over the second link is located.

Figure 15:
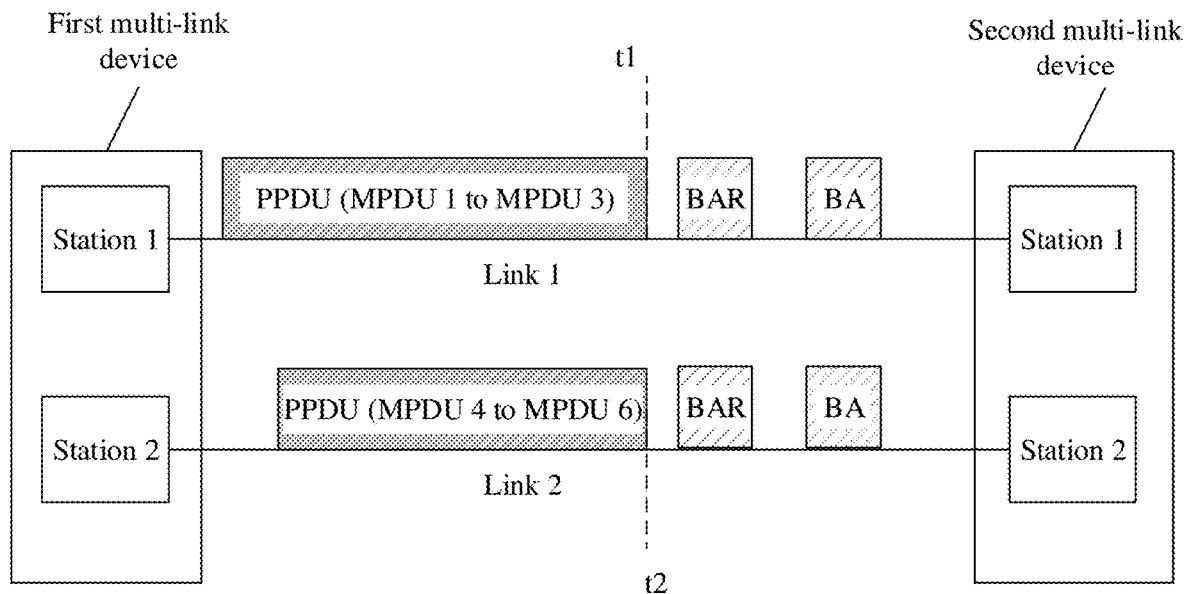
FIG. 15 is a schematic diagram of transmission of a data frame according to an embodiment of this application.

For example, as shown in FIG. 15, an end time of the PPDU in which the data frame transmitted over the first link is located is t1. An end time of the PPDU in which the data frame transmitted over the second link is located is t2. t1 is the same as t2.

1402: The first multi-link device sends a block acknowledgment request BAR frame to the second multi-link device over the first link and/or the second link.

In this embodiment of this application, after sending data frames to the second multi-link device over the first link and the second link, the first multi-link device sends a block acknowledgment request BAR frame to the second multi-link device over the first link and/or the second link.

1403: The second multi-link device sends a BA frame to the first multi-link device over the first link and/or the second link.

In this embodiment of this application, after receiving, over the first link and/or the second link, the BAR frame sent by the first multi-link device, the second multi-link device sends the BA frame to the first multi-link device over the first link and/or the second link. The BA frame includes receiving statuses of data frames transmitted over multiple links.

In this embodiment of this application, after sending the block acknowledgment request BAR frame to the second multi-link device over the first link and/or the second link, the first multi-link device may receive the BA frame over the first link and/or the second link.

Figure 16:
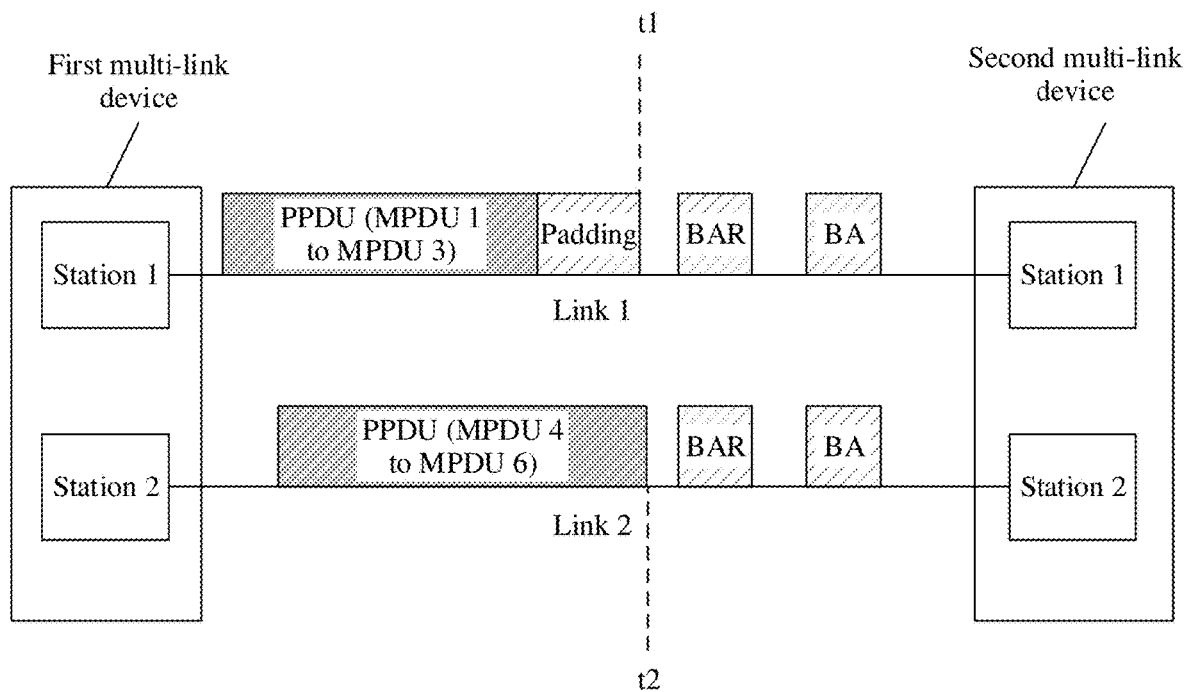
FIG. 16 is another schematic diagram of transmission of a data frame according to an embodiment of this application.

In a possible implementation, there is a padding bit behind the data frame sent over the first link, and the padding bit enables the transmission end time of the PPDU in which the data frame transmitted over the first link is located to be the same as the transmission end time of the PPDU in which the data frame transmitted over the second link is located, for example, as shown in FIG. 16.

Based on the method described in FIG. 14, the transmission end time of the PPDU in which the data frame transmitted over the first link is located is the same as the transmission end time of the PPDU in which the data frame transmitted over the second link is located. This helps avoid interruption of a transmit opportunity (transmit opportunity, TXOP). The data frame transmission method described in FIG. 14 may be implemented independently.

Alternatively, the data frame transmission method described in FIG. 14 may be combined with the embodiment corresponding to the foregoing method for determining a receiving status of a data frame. For example, in the method for determining a receiving status of a data frame in FIG. 4 or FIG. 8, the first multi-link device sends the data frames to the second multi-link device over the multiple links, where an end time of a PPDU in which a data frame sent over each link is located is the same. After the first multi-link device sends the data frames to the second multi-link device over the multiple links, and before the first multi-link device receives, over the first link in the multiple links, the block acknowledgment BA frame sent by the second multi-link device, the first multi-link device sends a BAR frame to the second multi-link device. Optionally, there is a padding bit behind a data frame sent over at least one link, and the padding bit enables the end time of the PPDU in which the data frame sent over each link is located is the same.

Alternatively, the data frame transmission method described in FIG. 14 may be combined with the block acknowledgment frame transmission method described in FIG. 9. For example, in the block acknowledgment frame transmission method described in FIG. 9, the first multi-link device sends the data frames to the second multi-link device on the multiple links, where an end time of a PPDU in which a data frame sent over each link is located is the same. The BAR frame sent by the first multi-link device to the second multi-link device indicates that the type of the BA frame is the multi-link BA frame. Optionally, there is a padding bit behind a data frame sent over at least one link, and the padding bit enables the end time of the PPDU in which the data frame sent over each link is located is the same.

FIG. 24 is a schematic diagram of a structure of a communication apparatus according to an embodiment of this application. The communication apparatus shown in FIG. 24 may be configured to perform some or all functions of the first multi-link device in the method embodiment described in FIG. 4. The apparatus may be a first multi-link device, or an apparatus in the first multi-link device, or an apparatus that can be used together with the first multi-link device. The communication apparatus may alternatively be a chip system. The communication apparatus shown in FIG. 24 may include a communication unit 2401 and a processing unit 2402. The communication unit may alternatively be referred to as a transceiver unit, or the communication unit includes a receiving unit and a sending unit. The processing unit 2402 is configured to perform data processing.

The communication unit 2401 is configured to send data frames to a second multi-link device over multiple links. The communication unit 2401 is further configured to receive a block acknowledgment BA frame sent by the second multi-link device over a first link in the multiple links, where the BA frame carries a bitmap, the bitmap indicates a receiving status of a data frame transmitted over the first link and indicates a receiving status of a data frame transmitted over a second link in the multiple links. The processing unit 2402 is configured to determine, based on a first time and a second time, a receiving status of a data frame corresponding to a first bit, where the first time is a transmission time of the data frame corresponding to the first bit, and the second time is a receiving time of the BA frame. The first bit is a bit that is in the bitmap and that is corresponding to the data frame transmitted over the second link, and a value of the first bit is a first value.

In a possible implementation, a manner in which the processing unit 2402 determines, based on the first time and the second time, the receiving status of the data frame corresponding to the first bit is specifically: if a delay between the second time and the first time is greater than or equal to a first threshold, determine that the receiving status of the data frame corresponding to the first bit is receiving failure.

In a possible implementation, T=t2−t1, T=t2−t1−t3, or T=t2−t1−2*t3. T is the delay between the second time and the first time, t2 is the second time, t1 is the first time, and t3 is a propagation delay between the first multi-link device and the second multi-link device.

In a possible implementation, the communication unit 2401 is further configured to: before sending the data frames to the second multi-link device over the multiple links, receive first information sent by the second multi-link device, where the first information carries the first threshold.

In a possible implementation, the first information includes multiple first thresholds, and each of the multiple first thresholds is corresponding to one link.

In a possible implementation, the communication unit 2401 is further configured to: before sending the data frames to the second multi-link device over the multiple links, receive indication information sent by the second multi-link device, where the indication information indicates whether the second multi-link device can determine, within a time period of the first threshold, the receiving status of the data frame received over the second link.

In a possible implementation, the transmission time of the data frame corresponding to the first bit is a sending end time of a downlink protocol data unit PPDU in which the data frame is located, or the transmission time of the data frame corresponding to the first bit is a sending end time of a symbol in which a last bit of the data frame is located.

In a possible implementation, the communication unit 2401 is further configured to: if the delay between the second time and the first time is greater than a second threshold, and the delay between the second time and the first time is less than the first threshold, send a block acknowledgment request BAR frame or a data frame to the second multi-link device before retransmitting the data frame corresponding to the first bit.

In a possible implementation, the BA frame includes a start sequence number of a data frame whose receiving status is fed back, the start sequence number is less than or equal to a first sequence number, and the first sequence number is a smallest value of sequence numbers of data frames that are not acknowledged to be received.

FIG. 24 is a schematic diagram of a structure of a communication apparatus according to an embodiment of this application. The communication apparatus shown in FIG. 24 may be configured to perform some or all functions of the first multi-link device in the method embodiment described in FIG. 8. The apparatus may be a first multi-link device, or an apparatus in the first multi-link device, or an apparatus that can be used matching the first multi-link device. The communication apparatus may alternatively be a chip system. The communication apparatus shown in FIG. 24 may include a communication unit 2401 and a processing unit 2402. The communication unit may alternatively be referred to as a transceiver unit, or the communication unit includes a receiving unit and a sending unit. The processing unit 2402 is configured to perform data processing.

The communication unit 2401 is configured to send data frames to a second multi-link device over multiple links. The communication unit 2401 is further configured to receive a block acknowledgment BA frame sent by the second multi-link device over a first link in the multiple links, where the BA frame carries a bitmap, the bitmap indicates a receiving status of a data frame transmitted over the first link and a receiving status of a data frame transmitted over a second link in the multiple links. The processing unit 2402 is configured to determine a first data frame sent over the second link, where the first data frame is a data frame whose transmission time is the last in a data frame set, and the data frame set includes a data frame that is sent over the second link and that has been correctly received.

The processing unit 2402 is further configured to determine that a receiving status of a second data frame is receiving failure, where the second data frame is a data frame sent over the second link before the first data frame, and a bit value corresponding to the second data frame in the bitmap is a first value.

In a possible implementation, the communication unit 2401 is further configured to: before retransmitting a third data frame, send a block acknowledgment request BAR frame or a data frame to the second multi-link device, where a bit value corresponding to the third data frame in the bitmap is the first value, and the third data frame is a data frame sent over the second link after the first data frame.

In a possible implementation, the BA frame includes a start sequence number of a data frame whose receiving status is fed back, the start sequence number is less than or equal to a first sequence number, and the first sequence number is a smallest value of sequence numbers of data frames that are not acknowledged to be received.

In a possible implementation, the data frame set includes data frames that are sent over multiple second links and that have been correctly received by the second link device.

FIG. 24 is a schematic diagram of a structure of a communication apparatus according to an embodiment of this application. The communication apparatus shown in FIG. 24 may be configured to perform some or all functions of the first multi-link device in the method embodiment described in FIG. 9. The apparatus may be a first multi-link device, or an apparatus in the first multi-link device, or an apparatus that can be used matching the first multi-link device. The communication apparatus may alternatively be a chip system. The communication apparatus shown in FIG. 24 may include a communication unit 2401 and a processing unit 2402. The communication unit may alternatively be referred to as a transceiver unit, or the communication unit includes a receiving unit and a sending unit. The processing unit 2402 is configured to perform data processing.

The communication unit 2401 is configured to send data frames to a second multi-link device over multiple links. The communication unit 2401 is further configured to send a block acknowledgment request BAR frame to the second multi-link device, where the BAR frame carries first indication information, and the first indication information indicates a type of a requested block acknowledgment BA frame. The communication unit 240 is further configured to receive a first BA frame sent by the second multi-link device, where the first BA frame is a BA frame of the type indicated by the first indication information.

In a possible implementation, the first indication information is located in a BAR type field in the BAR frame.

In a possible implementation, the BAR frame further includes second indication information, the second indication information indicates one or more links in the multiple links, and the first BA frame indicates a receiving status of a data frame sent over the one or more links.

In a possible implementation, the first indication information indicates that the type of the requested BA frame is a multi-link BA frame, and an interval between a transmission end time of the data frames and a transmission start time of the BAR frame is greater than or equal to a preset time interval.

In a possible implementation, before the first multi-link device sends the data frames to the second multi-link device over the multiple links, the communication unit 2401 is further configured to receive a reply manner of a BA frame sent by the second multi-link device, where the reply manner of the BA frame is delayed reply or immediate reply.

In a possible implementation, a time interval between a transmission end time of the BAR frame and a transmission start time of the first BA frame is greater than a preset threshold.

In a possible implementation, there is a padding bit behind the BAR frame, and the padding bit enables the time interval between the transmission end time of the BAR frame and the transmission start time of the first BA frame to be greater than the preset threshold.

FIG. 24 is a schematic diagram of a structure of a communication apparatus according to an embodiment of this application. The communication apparatus shown in FIG. 24 may be configured to perform some or all functions of the second multi-link device in the method embodiment described in FIG. 9. The apparatus may be a second multi-link device, or an apparatus in the second multi-link device, or an apparatus that can be used with the second multi-link device. The communication apparatus may alternatively be a chip system. The communication apparatus shown in FIG. 24 may include a communication unit 2401 and a processing unit 2402. The communication unit may alternatively be referred to as a transceiver unit, or the communication unit includes a receiving unit and a sending unit. The processing unit 2402 is configured to perform data processing.

The communication unit 2401 is configured to receive, over multiple links, data frames sent by a first multi-link device. The communication unit 2401 is further configured to receive a block acknowledgment request BAR frame sent by the first multi-link device, where the BAR frame carries first indication information, and the first indication information indicates a type of a requested block acknowledgment BA frame. The communication unit 2401 is further configured to send a first BA frame to the first multi-link device, where the first BA frame is a BA frame of the type indicated by the first indication information.

In a possible implementation, the first indication information is located in a BAR type field in the BAR frame.

In a possible implementation, the BAR frame further includes second indication information, the second indication information indicates one or more links in the multiple links, and the first BA frame indicates a receiving status of a data frame sent over the one or more links.

In a possible implementation, the first indication information indicates that the type of the requested block acknowledgment BA frame is a multi-link BA frame, and an interval between a transmission end time of the data frames and a transmission start time of the BAR frame is greater than or equal to a preset time interval.

In a possible implementation, before the second multi-link device receives, over the multiple links, the data frames sent by the first multi-link device, the second multi-link device may further send a reply manner of a BA frame to the first multi-link device, where the reply manner of the BA frame is delayed reply or immediate reply.

In a possible implementation, a time interval between a transmission end time of the BAR frame and a transmission start time of the first BA frame is greater than a preset threshold.

In a possible implementation, there is a padding bit behind the BAR frame, and the padding bit enables the time interval between the transmission end time of the BAR frame and the transmission start time of the first BA frame to be greater than the preset threshold.

FIG. 24 is a schematic diagram of a structure of a communication apparatus according to an embodiment of this application. The communication apparatus shown in FIG. 24 may be configured to perform some or all functions of the first multi-link device in the method embodiment described in FIG. 14. The apparatus may be a first multi-link device, or an apparatus in the first multi-link device, or an apparatus that can be used matching the first multi-link device. The communication apparatus may alternatively be a chip system. The communication apparatus shown in FIG. 24 may include a communication unit 2401 and a processing unit 2402. The communication unit may alternatively be referred to as a transceiver unit, or the communication unit includes a receiving unit and a sending unit. The processing unit 2402 is configured to perform data processing.

The communication unit 2401 is configured to send data frames to a second multi-link device over a first link and a second link, where a transmission end time of a PPDU in which the data frame transmitted over the first link is located is the same as a transmission end time of a PPDU in which the data frame transmitted over the second link is located. The communication unit 2401 is further configured to send a block acknowledgment request BAR frame to the second multi-link device over the first link and/or the second link. The communication unit 2401 is further configured to receive a BA frame over the first link and/or the second link.

In a possible implementation, there is a padding bit behind the data frame transmitted over the first link, and the padding bit enables the transmission end time of the PPDU in which the data frame transmitted over the first link is located to be the same as the transmission end time of the PPDU in which the data frame transmitted over the second link is located.

FIG. 24 is a schematic diagram of a structure of a communication apparatus according to an embodiment of this application. The communication apparatus shown in FIG. 24 may be configured to perform some or all functions of the second multi-link device in the method embodiment described in FIG. 14. The apparatus may be a second multi-link device, or an apparatus in the second multi-link device, or an apparatus that can be used with the second multi-link device. The communication apparatus may alternatively be a chip system. The communication apparatus shown in FIG. 24 may include a communication unit 2401 and a processing unit 2402. The communication unit may alternatively be referred to as a transceiver unit, or the communication unit includes a receiving unit and a sending unit. The processing unit 2402 is configured to perform data processing.

The communication unit 2401 is configured to receive, over a first link and a second link, data frames sent by a first multi-link device, where a transmission end time of a PPDU in which the data frame transmitted over the first link is located is the same as a transmission end time of a PPDU in which the data frame transmitted over the second link is located. The communication unit 2401 is configured to receive, over the first link and/or the second link, a block acknowledgment request BAR frame sent by the first multi-link device. The communication unit 2401 is configured to send a BA frame to the first multi-link device over the first link and/or the second link.

In a possible implementation, there is a padding bit behind the data frame transmitted over the first link, and the padding bit enables the transmission end time of the PPDU in which the data frame transmitted over the first link is located to be the same as the transmission end time of the PPDU in which the data frame transmitted over the second link is located.

Figure 25A:
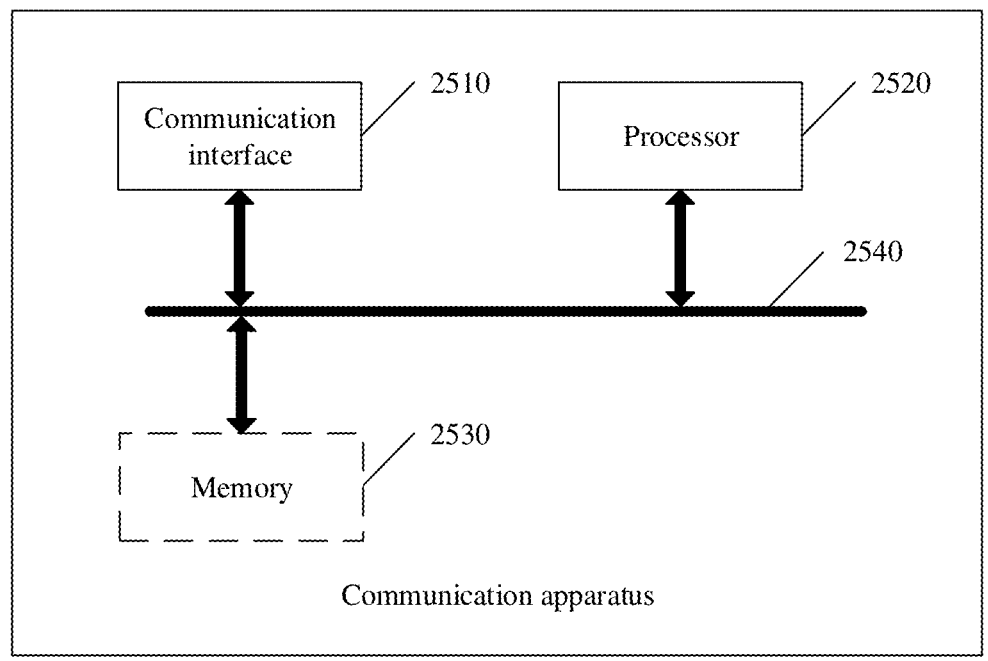
FIG. 25a is a schematic diagram of a structure of another communication apparatus according to an embodiment of this application.

FIG. 25*a* shows a communication apparatus 250 according to an embodiment of this application. The communication apparatus 250 is configured to implement functions of the first multi-link device in the method embodiments described in FIG. 4, FIG. 8, FIG. 9, or FIG. 14; or is configured to implement functions of the second multi-link device in the method embodiments described in FIG. 4, FIG. 8, FIG. 9, or FIG. 14. The apparatus may be the first multi-link device or the second multi-link device, or the apparatus may be an apparatus used in the first multi-link device or an apparatus used in the second multi-link device. The apparatus used in the first multi-link device or the second multi-link device may be a chip system or a chip in the first multi-link device or the second multi-link device. The chip system may include a chip, or may include a chip and another discrete component.

The communication apparatus 250 includes at least one processor 2525, configured to implement a data processing function of the first multi-link device or the second multi-link device of this application.

The apparatus 250 may further include a communication interface 2510, configured to implement sending and receiving operations of the first multi-link device or the second multi-link device in this application. In this embodiment of this application, the communication interface may be a transceiver, a circuit, a bus, a module, or a communication interface of another type, and is configured to communicate with another device through a transmission medium. For example, the communication interface 2510 is used by an apparatus in the apparatus 250 to communicate with another device. The processor 2525 receives and sends data through the communication interface 2510, and is configured to implement the methods in the foregoing method embodiments.

The apparatus 250 may further include at least one memory 2530, configured to store program instructions and/or data. The memory 2530 is coupled to the processor 2525. Coupling in this embodiment of this application is indirect coupling or a communication connection between apparatuses, units, or modules, and may be in an electrical, mechanical, or another form, and is used for information exchange between the apparatuses, units, or modules. The processor 2525 may operate with the memory 2530 collaboratively. The processor 2525 may execute the program instructions stored in the memory 2530. At least one of the at least one memory may be included in the processor.

A specific connection medium between the communication interface 2510, the processor 2525, and the memory 2530 is not limited in this embodiment of this application. In this embodiment of this application, the memory 2530, the processor 2525, and the communication interface 2510 are connected through a bus 2540 in FIG. 25*a*. The bus is represented by using a bold line in FIG. 25*a*. A connection manner between other components is merely an example for description, and is not limited thereto. The bus may be classified into an address bus, a data bus, a control bus, or the like. For ease of representation, only one thick line is used to represent the bus in FIG. 25*a*, but this does not mean that there is only one bus or only one type of bus.

When the apparatus 250 is specifically an apparatus used for the first multi-link device or the second multi-link device, for example, when the apparatus 250 is specifically a chip or a chip system, the communication interface 2510 may output or receive a baseband signal. When the apparatus 250 is specifically the first multi-link device or the second multi-link device, the communication interface 2510 may output or receive a radio frequency signal. In embodiments of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

Figure 25B:
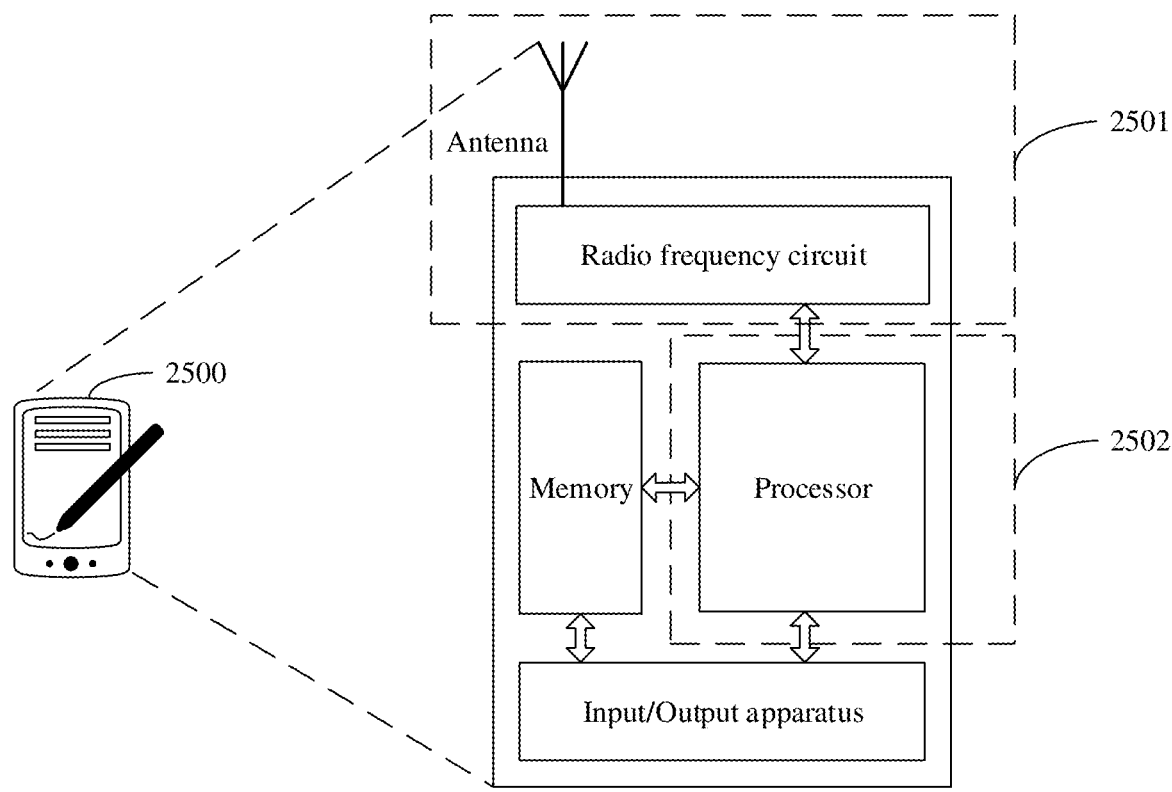
FIG. 25b is a schematic diagram of a structure of still another communication apparatus according to an embodiment of this application.

In an example, FIG. 25*b* is a schematic diagram of a structure of another communication apparatus 2500 according to an embodiment of this application. The apparatus may be a first multi-link device or a second multi-link device. The communication apparatus may perform operations of the first multi-link device or the second multi-link device in the method embodiment described in FIG. 4, FIG. 8, FIG. 9, or FIG. 14.

For ease of description, FIG. 25*b* shows only main components of the communication apparatus. As shown in FIG. 25*b*, the communication apparatus 2500 includes a processor, a memory, a radio frequency circuit, an antenna, and an input/output apparatus. The processor is mainly configured to: process a communication protocol and communication data, and control an entire station, execute a software program, and process data of the software program. For example, the processor is configured to support the communication apparatus in performing operations performed by the first multi-link device or the second multi-link device in a flow described in FIG. 4, FIG. 8, FIG. 9, or FIG. 14. The memory is configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The communication apparatus 2500 may further include an input/output apparatus, for example, a touchscreen, a display screen, or a keyboard that is mainly configured to receive data entered by a user and output data to the user. It should be noted that some types of stations may not have an input/output apparatus.

After the station is powered on, the processor may read the software program in a storage unit, parse and execute instructions of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in the electromagnetic wave form through the antenna. When data is sent to the station, the radio frequency circuit receives the radio frequency signal through the antenna, converts the radio frequency signal into a baseband signal, and outputs the baseband signal to the processor. The processor converts the baseband signal into data and processes the data.

A person skilled in the art may understand that for ease of description, FIG. 25b shows only one memory and one processor. An actual station may include multiple processors and memories. The memory may also be referred to as a storage medium, a storage device, or the like. This is not limited in embodiments of this application.

In an optional implementation, the processor may include a baseband processor and a central processing unit (central processing unit, CPU). The baseband processor is mainly configured to process a communication protocol and communication data. The CPU is mainly configured to: control the entire station, execute a software program, and process data of the software program. Optionally, the processor may alternatively be a network processor (network processor, NP) or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof. The memory may include a volatile memory (volatile memory), for example, a random access memory (random access memory, RAM). The memory may alternatively include a non-volatile memory (non-volatile memory), for example, a flash memory (flash memory), a hard disk drive (hard disk drive, HDD), or a solid-state drive (solid-state drive, SSD). The memory may alternatively include a combination of the foregoing types of memories.

For example, in this embodiment of this application, as shown in FIG. 25b, an antenna and a radio frequency circuit that have receiving and sending functions may be considered as a communication unit 2501 of a station 2500, and a processor with a processing function may be considered as a processing unit 2502 of the station 2500.

The communication unit 2501 may also be referred to as a transceiver, a transceiver machine, a transceiver apparatus, a transceiver unit, or the like, and is configured to implement the sending and receiving functions. Optionally, a component that is in the communication unit 2501 and that is configured to implement the receiving function may be considered as a receiving unit, and a component that is in the communication unit 2501 and that is configured to implement the sending function may be considered as a sending unit. That is, the communication unit 2501 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like.

In some embodiments, the communication unit 2501 and the processing unit 2502 may be integrated into one component, or may be separated as different components. In addition, the processor and the memory may be integrated into one component, or may be separated as different components.

The communication unit 2501 may be configured to perform sending and receiving operations of the first multi-link device or the second multi-link device in the foregoing method embodiments. The processing unit 2502 may be configured to perform the data processing operation of the first multi-link device or the second multi-link device in the foregoing method embodiments.

An embodiment of this application further provides a computer-readable storage medium. The computer-readable storage medium stores instructions. When run on a processor, the instructions are used for performing the method performed by the first multi-link device in the foregoing method embodiments.

An embodiment of this application further provides a computer-readable storage medium. The computer-readable storage medium stores instructions. When run on a processor, the instructions are used for performing the method performed by the second multi-link device in the foregoing method embodiments.

An embodiment of this application further provides a computer program product. When run on a processor, the computer program product is used for performing the method performed by the first multi-link device in the foregoing method embodiments.

An embodiment of this application further provides a computer program product. When run on a processor, the computer program product is used for performing the method performed by the second multi-link device in the foregoing method embodiments.

Based on a same inventive idea, a problem-resolving principle of the apparatus provided in this embodiment of this application is similar to that of the method embodiments of this application. Therefore, for implementation of the apparatus, refer to the implementation of the methods. For brevity of description, details are not described herein again.

It should be noted that, for brief description, the foregoing method embodiments are each represented as a combination of a series of actions. However, a person skilled in the art should appreciate that this application is not limited to the described order of the actions, because according to this application, some steps may be performed in another order or simultaneously. A person skilled in the art should further know that embodiments described in this specification are all example embodiments, and the related actions and modules are not necessarily required by this application.

Cross reference may be made to descriptions of embodiments provided in this application, and the descriptions of embodiments have different focuses. For a part not described in detail in an embodiment, refer to related descriptions of another embodiment. For ease and brevity of description, for example, for functions and performed steps of the apparatuses and devices provided in embodiments of this application, refer to related descriptions of the method embodiments of this application. The method embodiments and the apparatus embodiments may also be referenced, combined, or cited to each other.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method, comprising:
sending, by a first multi-link device, data frames to a second multi-link device over multiple links;
receiving, by the first multi-link device over a first link of the multiple links, a block acknowledgment (BA) frame sent by the second multi-link device, wherein the BA frame carries a bitmap, and wherein the bitmap indicates a receiving status of a data frame transmitted over the first link and indicates a receiving status of a data frame transmitted over a second link of the multiple links; and
determining, by the first multi-link device, based on a first time and a second time, a receiving status of a data frame corresponding to a first bit, wherein the first time is a transmission time of the data frame corresponding to the first bit, and the second time is a receiving time of the BA frame, wherein the first bit is a bit that is in the bitmap and that corresponds to the data frame transmitted over the second link, and wherein a value of the first bit is a first value.

2. The method according to claim 1, wherein determining the receiving status of the data frame corresponding to the first bit comprises:
determining, by the first multi-link device, in response to a delay between the second time and the first time being greater than or equal to a first threshold, that the receiving status of the data frame corresponding to the first bit is a receiving failure.

3. The method according to claim 2, wherein T=t2−t1, T=t2−t1−t3, or T=t2−t1−2*t3, wherein T is the delay between the second time and the first time, wherein t2 is the second time, wherein t1 is the first time, and wherein t3 is a propagation delay between the first multi-link device and the second multi-link device.

4. The method according to claim 2, further comprising performing, before sending the data frames to the second multi-link device over the multiple links:
receiving, by the first multi-link device, first information sent by the second multi-link device, wherein the first information carries the first threshold.

5. The method according to claim 4, wherein the first information comprises multiple first thresholds, and wherein each first threshold of the multiple first thresholds corresponds to one link of the multiple links.

6. The method according to claim 2, further comprising performing, before sending the data frames to the second multi-link device over the multiple links:
receiving, by the first multi-link device, indication information sent by the second multi-link device, wherein the indication information indicates whether a station on the first link in the second multi-link device can determine, within a time period of the first threshold after the second multi-link device receives the data frame over the second link, the receiving status of the data frame received over the second link.

7. The method according to claim 2, further comprising:
performing, in response to the delay between the second time and the first time being greater than a second threshold, and further in response to the delay between the second time and the first time being less than the first threshold, sending, by the first multi-link device, at least one of a block acknowledgment request (BAR) frame or a data frame to the second multi-link device before retransmitting the data frame corresponding to the first bit.

8. The method according to claim 1, wherein at least one of the transmission times of the data frame corresponding to the first bit is a transmission end time of a downlink protocol data unit (PPDU) in which the data frame is located, or the transmission time of the data frame corresponding to the first bit is a transmission end time of a symbol in which a last bit of the data frame is located.

9. The method according to claim 1, wherein the BA frame comprises a start sequence number of a data frame whose receiving status is fed back, wherein the start sequence number is less than or equal to a first sequence number, and wherein the first sequence number is a smallest value of sequence numbers of data frames that are not acknowledged to be received.

10. A first multi-link device, comprising:
a communication unit;
at least one processor; and
a non-transitory storage medium having a computer program stored thereon for execution by the at least one processor, the computer program including instructions to:
cause the communication unit to send data frames to a second multi-link device over multiple links;
receive, through the communication unit, over a first link in the multiple links, a block acknowledgment (BA) frame sent by the second multi-link device, wherein the BA frame carries a bitmap, and wherein the bitmap indicates a receiving status of a data frame transmitted over the first link and further indicates a receiving status of a data frame transmitted over a second link in the multiple links; and
determine, based on a first time and a second time, a receiving status of a data frame corresponding to a first bit, wherein the first time is a transmission time of the data frame corresponding to the first bit, wherein the second time is a receiving time of the BA frame, wherein the first bit is a bit that is in the bitmap and that corresponds to the data frame transmitted over the second link, and wherein a value of the first bit is a first value.

11. The first multi-link device according to claim 10, wherein the instructions to determine the receiving status of the data frame corresponding to the first bit include instructions to:
determine, in response to a delay between the second time and the first time being greater than or equal to a first threshold, that the receiving status of the data frame corresponding to the first bit is receiving failure.

12. The first multi-link device according to claim 11, wherein T=t2−t1, T=t2−t1−t3, or T=t2−t1−2*t3, wherein T is the delay between the second time and the first time, wherein t2 is the second time, wherein t1 is the first time, and wherein t3 is a propagation delay between the first multi-link device and the second multi-link device.

13. The first multi-link device according to claim 11, wherein the computer program further includes instructions to:
receive, through the communication unit before sending the data frames to the second multi-link device over the multiple links, first information sent by the second multi-link device, wherein the first information carries the first threshold.

14. The first multi-link device according to claim 13, wherein the first information comprises multiple first thresholds, and wherein each threshold of the multiple first thresholds corresponds to one link.

15. The first multi-link device according to claim 11, wherein the computer program further includes instructions to:
receive, through the communication unit, before sending the data frames to the second multi-link device over the multiple links, indication information sent by the second multi-link device, wherein the indication information indicates whether the second multi-link device can determine, within a time period of the first threshold, the receiving status of the data frame received over the second link.

16. The first multi-link device according to claim 11, wherein the computer program further includes instructions to:
cause the communication unit to send, in response to the delay between the second time and the first time being greater than a second threshold, and further in response to the delay between the second time and the first time being less than the first threshold, a block acknowledgment request (BAR) frame or a data frame to the second multi-link device before retransmitting the data frame corresponding to the first bit.

17. The first multi-link device according to claim 11, wherein the BA frame comprises a start sequence number of a data frame whose receiving status is fed back, wherein the start sequence number is less than or equal to a first sequence number, and wherein the first sequence number is a smallest value of sequence numbers of data frames that are not acknowledged to be received.

18. The first multi-link device according to claim 10, wherein at least one of the transmission times of the data frame corresponding to the first bit is a transmission end time of a downlink protocol data unit (PPDU) in which the data frame is located, or the transmission time of the data frame corresponding to the first bit is a transmission end time of a symbol in which a last bit of the data frame is located.

19. A chip system, comprising:
at least one processor; and
a communication interface;
wherein the at least one processor runs a computer program to perform:
sending data frames to a second multi-link device over multiple links;
receiving, over a first link of the multiple links, a block acknowledgment (BA) frame sent by the second multi-link device, wherein the BA frame carries a bitmap, and wherein the bitmap indicates a receiving status of a data frame transmitted over the first link and indicates a receiving status of a data frame transmitted over a second link of the multiple links; and
determining, based on a first time and a second time, a receiving status of a data frame corresponding to a first bit, wherein the first time is a transmission time of the data frame corresponding to the first bit, and the second time is a receiving time of the BA frame, wherein the first bit is a bit that is in the bitmap and that corresponds to the data frame transmitted over the second link, and wherein a value of the first bit is a first value.

20. The chip system according to claim 19, wherein determining the receiving status of the data frame corresponding to the first bit comprises:
determining, in response to a delay between the second time and the first time being greater than or equal to a first threshold, that the receiving status of the data frame corresponding to the first bit is receiving failure.

* * * * *